US012461531B2

(12) United States Patent
Klingensmith

(10) Patent No.: US 12,461,531 B2
(45) Date of Patent: Nov. 4, 2025

(54) TOPOLOGY PROCESSING FOR WAYPOINT-BASED NAVIGATION MAPS

(71) Applicant: Boston Dynamics, Inc., Waltham, MA (US)

(72) Inventor: Matthew Jacob Klingensmith, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 642 days.

(21) Appl. No.: 17/804,982

(22) Filed: Jun. 1, 2022

(65) Prior Publication Data
US 2022/0390954 A1 Dec. 8, 2022

Related U.S. Application Data

(60) Provisional application No. 63/202,286, filed on Jun. 4, 2021.

(51) Int. Cl.
*G05D 1/644* (2024.01)
*G01C 22/00* (2006.01)
(Continued)

(52) U.S. Cl.
CPC ........... *G05D 1/0219* (2013.01); *G01C 22/00* (2013.01); *G05D 1/0221* (2013.01); *G05D 1/027* (2013.01);
(Continued)

(58) Field of Classification Search
CPC .... G05D 1/0219; G05D 1/2469; G05D 1/644; G05D 1/639
See application file for complete search history.

(56) References Cited

U.S. PATENT DOCUMENTS 5,111,401 A 5/1992 Everett et al.
5,378,969 A 1/1995 Haikawa
(Continued)

FOREIGN PATENT DOCUMENTS

CA 2928262 7/2012
CN 102037317 A 4/2011
(Continued)

OTHER PUBLICATIONS

Abraham et al., "A Topological Approach of Path Planning for Autonomous Robot Navigation inDynamic Environments," The 2009 IEEE/RSJ International Conference on Intelligent Robots and Systems, Oct. 2009, pp. 4907-4912, doi: 10.1109/IROS.2009.5354771.
(Continued)

*Primary Examiner* — Dino Kujundzic
(74) *Attorney, Agent, or Firm* — Knobbe, Martens, Olson & Bear, LLP

(57) ABSTRACT

The operations of a computer-implemented method include obtaining a topological map of an environment including a series of waypoints and a series of edges. Each edge topologically connects a corresponding pair of adjacent waypoints. The edges represent traversable routes for a robot. The operations include determining, using the topological map and sensor data captured by the robot, one or more candidate alternate edges. Each candidate alternate edge potentially connects a corresponding pair of waypoints that are not connected by one of the edges. For each respective candidate alternate edge, the operations include determining, using the sensor data, whether the robot can traverse the respective candidate alternate edge without colliding with an obstacle and, when the robot can traverse the respective candidate alternate edge, confirming the respective candidate alternate edge as a respective alternate (Continued)

edge. The operations include updating, using nonlinear optimization and the confirmed alternate edges, the topological map.

24 Claims, 17 Drawing Sheets

(51) Int. Cl.
    *G05D 1/00*           (2006.01)
    *G06F 18/2134*      (2023.01)
    *G06F 18/2135*      (2023.01)
    *G05D 1/246*       (2024.01)
    *G06F 18/2132*      (2023.01)

(52) U.S. Cl.
    CPC ........ *G05D 1/644* (2024.01); *G06F 18/21345* (2023.01); *G06F 18/21355* (2023.01); *G05D 1/2469* (2024.01); *G06F 18/21326* (2023.01)

(56) References Cited

U.S. PATENT DOCUMENTS

| | | | |
|---|---|---|---|
| 7,211,980 B1 | 5/2007 | Bruemmer et al. | |
| 7,865,267 B2 | 1/2011 | Sabe et al. | |
| 7,912,583 B2 | 3/2011 | Gutmann et al. | |
| 8,270,730 B2 | 9/2012 | Watson | |
| 8,346,391 B1 | 1/2013 | Anhalt et al. | |
| 8,401,783 B2 | 3/2013 | Hyung et al. | |
| 8,548,734 B2 | 10/2013 | Barbeau et al. | |
| 8,849,494 B1 | 9/2014 | Herbach et al. | |
| 8,930,058 B1 | 1/2015 | Quist et al. | |
| 9,352,470 B1 | 5/2016 | da Silva et al. | |
| 9,561,592 B1 | 2/2017 | da Silva et al. | |
| 9,574,883 B2 | 2/2017 | Watts et al. | |
| 9,586,316 B1 | 3/2017 | Swilling | |
| 9,594,377 B1 | 3/2017 | Perkins et al. | |
| 9,717,387 B1 | 8/2017 | Szatmary et al. | |
| 9,844,879 B1 | 12/2017 | Cousins et al. | |
| 9,896,091 B1 | 2/2018 | Kurt et al. | |
| 9,908,240 B1 | 3/2018 | da Silva et al. | |
| 9,910,441 B2 | 3/2018 | Levinson et al. | |
| 9,933,781 B1 | 4/2018 | Bando et al. | |
| 9,969,086 B1 | 5/2018 | Whitman | |
| 9,975,245 B1 | 5/2018 | Whitman | |
| 10,081,098 B1 | 9/2018 | Nelson et al. | |
| 10,081,104 B1 | 9/2018 | Swilling | |
| 10,226,870 B1 | 3/2019 | Silva et al. | |
| 10,639,794 B2 | 5/2020 | Cousins et al. | |
| 11,175,664 B1 | 11/2021 | Boyraz et al. | |
| 11,268,816 B2 | 3/2022 | Fay et al. | |
| 11,287,826 B2 | 3/2022 | Whitman et al. | |
| 11,416,003 B2 | 8/2022 | Whitman et al. | |
| 11,480,974 B2 | 10/2022 | Lee et al. | |
| 11,518,029 B2 | 12/2022 | Cantor et al. | |
| 11,656,630 B2 | 5/2023 | Jonak et al. | |
| 11,747,825 B2 | 9/2023 | Jonak et al. | |
| 11,774,247 B2 | 10/2023 | Fay et al. | |
| 12,222,723 B2 | 2/2025 | Yamauchi | |
| 2005/0131581 A1 | 6/2005 | Sabe et al. | |
| 2006/0009876 A1 | 1/2006 | McNeil | |
| 2006/0025888 A1 | 2/2006 | Gutmann et al. | |
| 2006/0167621 A1 | 7/2006 | Dale | |
| 2007/0233338 A1 | 10/2007 | Ariyur et al. | |
| 2007/0282564 A1 | 12/2007 | Sprague et al. | |
| 2008/0009966 A1 | 1/2008 | Bruemmer et al. | |
| 2008/0027590 A1 | 1/2008 | Phillips et al. | |
| 2008/0086241 A1 | 4/2008 | Phillips et al. | |
| 2009/0125225 A1 | 5/2009 | Hussain et al. | |
| 2010/0066587 A1 | 3/2010 | Yamauchi et al. | |
| 2010/0172571 A1 | 7/2010 | Yoon et al. | |
| 2011/0035087 A1 | 2/2011 | Kim et al. | |
| 2011/0172850 A1 | 7/2011 | Paz-Meidan et al. | |
| 2011/0224901 A1 | 9/2011 | Aben et al. | |
| 2012/0089295 A1 | 4/2012 | Ahn et al. | |
| 2012/0182392 A1 | 7/2012 | Kearns et al. | |
| 2013/0141247 A1 | 6/2013 | Ricci | |
| 2013/0231779 A1 | 9/2013 | Purkayastha et al. | |
| 2013/0323432 A1 | 12/2013 | Rygas et al. | |
| 2013/0325244 A1 | 12/2013 | Wang et al. | |
| 2014/0188325 A1 | 7/2014 | Johnson et al. | |
| 2015/0158182 A1 | 6/2015 | Farlow et al. | |
| 2015/0355638 A1 | 12/2015 | Field et al. | |
| 2016/0375901 A1 | 12/2016 | di Cairano et al. | |
| 2017/0017236 A1 | 1/2017 | Song et al. | |
| 2017/0095383 A1 | 4/2017 | Li et al. | |
| 2017/0120448 A1 | 5/2017 | Lee et al. | |
| 2017/0131102 A1 | 5/2017 | Wirbel et al. | |
| 2017/0165835 A1 | 6/2017 | Agarwal et al. | |
| 2017/0203446 A1 | 7/2017 | Dooley et al. | |
| 2017/0341235 A1 | 11/2017 | Baloch et al. | |
| 2018/0051991 A1 | 2/2018 | Hong | |
| 2018/0161986 A1 | 6/2018 | Kee et al. | |
| 2018/0173242 A1 | 6/2018 | Lalonde et al. | |
| 2018/0328737 A1 | 11/2018 | Frey et al. | |
| 2018/0348742 A1 | 12/2018 | Byme et al. | |
| 2019/0016312 A1 | 1/2019 | Carlson et al. | |
| 2019/0056743 A1 | 2/2019 | Alesiani et al. | |
| 2019/0079523 A1 | 3/2019 | Zhu et al. | |
| 2019/0080463 A1 | 3/2019 | Davison et al. | |
| 2019/0113927 A1 | 4/2019 | England et al. | |
| 2019/0138029 A1 | 5/2019 | Ryll et al. | |
| 2019/0171911 A1 | 6/2019 | Greenberg | |
| 2019/0187699 A1 | 6/2019 | Salour et al. | |
| 2019/0187703 A1 | 6/2019 | Millard et al. | |
| 2019/0213896 A1 | 7/2019 | Gohi et al. | |
| 2019/0318277 A1 | 10/2019 | Goldman et al. | |
| 2019/0332114 A1 | 10/2019 | Moroniti et al. | |
| 2020/0039427 A1 | 2/2020 | Chen et al. | |
| 2020/0109954 A1 | 4/2020 | Li et al. | |
| 2020/0117198 A1 | 4/2020 | Whitman et al. | |
| 2020/0117214 A1 | 4/2020 | Jonak et al. | |
| 2020/0164521 A1 | 5/2020 | Li | |
| 2020/0174460 A1 | 6/2020 | Byme et al. | |
| 2020/0192388 A1 | 6/2020 | Zhang et al. | |
| 2020/0198140 A1 | 6/2020 | Dupuis et al. | |
| 2020/0216061 A1 | 7/2020 | Zidek | |
| 2020/0249033 A1 | 8/2020 | Gelhar | |
| 2020/0258400 A1 | 8/2020 | Yuan et al. | |
| 2020/0333790 A1 | 10/2020 | Kobayashi et al. | |
| 2020/0386882 A1 | 12/2020 | Klein et al. | |
| 2020/0409382 A1 | 12/2020 | Herman et al. | |
| 2021/0012111 A1* | 1/2021 | Choi | G01S 17/89 |
| 2021/0041243 A1 | 2/2021 | Fay et al. | |
| 2021/0041887 A1 | 2/2021 | Whitman et al. | |
| 2021/0064055 A1 | 3/2021 | Jun | |
| 2021/0141389 A1 | 5/2021 | Jonak et al. | |
| 2021/0180961 A1 | 6/2021 | Oh | |
| 2021/0200219 A1* | 7/2021 | Gaschler | G05D 1/0274 |
| 2021/0311480 A1 | 10/2021 | Yang et al. | |
| 2021/0323618 A1 | 10/2021 | Komoroski | |
| 2021/0382491 A1 | 12/2021 | Murotani et al. | |
| 2022/0024034 A1 | 1/2022 | Wei et al. | |
| 2022/0063662 A1 | 3/2022 | Sprunk et al. | |
| 2022/0083062 A1 | 3/2022 | Jaquez et al. | |
| 2022/0088776 A1 | 3/2022 | Kuffner | |
| 2022/0137637 A1 | 5/2022 | Baldini et al. | |
| 2022/0155078 A1 | 5/2022 | Fay et al. | |
| 2022/0179420 A1 | 6/2022 | Whitman et al. | |
| 2022/0244741 A1 | 8/2022 | da Silva et al. | |
| 2022/0276654 A1 | 9/2022 | Lee et al. | |
| 2022/0342421 A1 | 10/2022 | Kearns | |
| 2022/0374024 A1 | 11/2022 | Whitman et al. | |
| 2022/0388170 A1 | 12/2022 | Merewether | |
| 2022/0390950 A1 | 12/2022 | Yamauchi | |
| 2023/0062175 A1 | 3/2023 | Yahata | |
| 2023/0273621 A1* | 8/2023 | Okamori | G01C 21/3453 701/414 |
| 2023/0309776 A1 | 10/2023 | Li et al. | |
| 2023/0359220 A1 | 11/2023 | Jonak et al. | |
| 2023/0400307 A1 | 12/2023 | Fay et al. | |
| 2023/0418297 A1 | 12/2023 | Komoroski et al. | |

(56) References Cited

U.S. PATENT DOCUMENTS

| | | |
|---|---|---|
| 2024/0061436 A1 | 2/2024 | Tsuzaki et al. |
| 2024/0165821 A1 | 5/2024 | Dabiri et al. |
| 2024/0361779 A1 | 10/2024 | Dellon et al. |

FOREIGN PATENT DOCUMENTS

| | | |
|---|---|---|
| CN | 203371557 | 1/2014 |
| CN | 103869820 A | 6/2014 |
| CN | 104075715 A | 10/2014 |
| CN | 104470685 A | 3/2015 |
| CN | 104536445 A | 4/2015 |
| CN | 106200633 A | 12/2016 |
| CN | 106371445 A | 2/2017 |
| CN | 107301654 A | 10/2017 |
| CN | 107943038 A | 4/2018 |
| CN | 108052103 | 5/2018 |
| CN | 108292473 A | 7/2018 |
| CN | 108801269 A | 11/2018 |
| CN | 109029417 A | 12/2018 |
| CN | 109540142 A | 3/2019 |
| CN | 111604916 | 9/2020 |
| CN | 211956515 | 11/2020 |
| CN | 112034861 | 12/2020 |
| CN | 113168184 A | 7/2021 |
| CN | 113633219 | 11/2021 |
| CN | 114174766 A | 3/2022 |
| CN | 114503043 A | 5/2022 |
| DE | 102016206209 A1 | 10/2017 |
| JP | H02127180 A | 5/1990 |
| JP | H09-134217 | 11/2003 |
| JP | 2005088189 A | 4/2005 |
| JP | 2006-011880 | 1/2006 |
| JP | 2006239844 A | 9/2006 |
| JP | 2007041656 A | 2/2007 |
| JP | 2008-072963 | 4/2008 |
| JP | 2009223628 A | 10/2009 |
| JP | 2009271513 A | 11/2009 |
| JP | 2010253585 A | 11/2010 |
| JP | 2013-250795 | 12/2013 |
| JP | 2014-123200 | 7/2014 |
| JP | 2014151370 A | 8/2014 |
| JP | 2016-081404 | 5/2016 |
| JP | 2016-103158 | 6/2016 |
| JP | 2017182502 A | 10/2017 |
| JP | 2019500691 A | 1/2019 |
| JP | 2019021197 A | 2/2019 |
| JP | 2022504039 A | 1/2022 |
| JP | 2022543997 A | 10/2022 |
| JP | 7219812 B2 | 2/2023 |
| JP | 7259020 B2 | 4/2023 |
| KR | 10-1121763 | 3/2012 |
| KR | 20120019893 A | 3/2012 |
| KR | 20130020107 A | 2/2013 |
| KR | 20220078563 A | 6/2022 |
| KR | 20220083666 A | 6/2022 |
| KR | 102492242 B1 | 1/2023 |
| KR | 102504729 B1 | 3/2023 |
| KR | 20230035139 A | 3/2023 |
| KR | 102533690 B1 | 5/2023 |
| WO | WO 2007/051972 | 5/2007 |
| WO | WO2017/090108 | 6/2017 |
| WO | WO 2018/231616 A1 | 12/2018 |
| WO | WO 2020/076418 A1 | 4/2020 |
| WO | WO 2020/076422 | 4/2020 |
| WO | WO 2021/025707 | 2/2021 |
| WO | WO 2021/025708 A1 | 2/2021 |
| WO | WO 2022/164832 A1 | 8/2022 |
| WO | WO 2022/256811 | 12/2022 |
| WO | WO 2022/256815 | 12/2022 |
| WO | WO 2022/256821 | 12/2022 |
| WO | WO 2023/249979 A1 | 12/2023 |
| WO | WO 2024/220811 A2 | 10/2024 |

OTHER PUBLICATIONS

Alkautsar, "Topological Path Planning and Metric Path Planning," https://medium.com/@arifmaulanaa/topological-path-planning-and-metric-path-planning-5c0fa7f107f2, downloaded Feb. 13, 2023, 3 pages.

boost.org, "buffer (with strategies)", https://www.boost.org/doc/libs/1_75_0/libs/geometry/doc/html/geometry/reference/algorithms/buffer/buff er_7_with_strategies.html, downloaded Feb. 1, 2023, 5 pages.

Buchegger et al. "An Autonomous Vehicle for Parcel Delivery in Urban Areas," 2018 21st International Conference on Intelligent Transporation Sytems (ITSC), Nov. 2018, pp. 2961-2967, doi: 10.1109/ITSC.2018.8569339.

Cao, "Topological Path Planning for Crowd Navigation", https://www.ri.cmu.edu/app/uploads/2019/05/thesis.pdf, May 2019, 24 pages.

Collins et al. "Efficient Planning for High-Speed MAV Flight in Unknown Environments Using Online Sparse Topological Graphs," 2020 IEEE International Conference on Robotics and Automation (ICRA), Aug. 2020, pp. 11450-1456, doi: 10.1109/ICRA40945.2020.9197167.

github.com, "cartographer-project/cartographer", https://github.com/cartographer-project/cartographer, downloaded Feb. 1, 2023, 4 pages.

International Search Report and Written Opinion for PCT Application No. PCT/US2019/047804, Apr. 6, 2020, 14 pages.

International Search Report and Written Opinion for PCT Application No. PCT/US2019/051092, Apr. 30, 2020, 12 pages.

International Search Report and Written Opinion for PCT Application No. PCT/US2022/072710, Sep. 27, 2022, 16 pages.

International Search Report and Written Opinion for PCT Application No. PCT/US2022/072703, Sep. 22, 2022, 13 pages.

International Search Report and Written Opinion for PCT Application No. PCT/US2022/072717, Sep. 30, 2022, 26 pages.

Kuipers et al. "A Robot Exploration and Mapping Strategy Based on a Semantic Hierarchy of SpatialRepresentations," Journal of Robotics & Autonomous Systems vol. 8, 1991, pp. 47-63, doi: 10.1016/0921-8890(91)90014-C.

Mccammon et al., "Topological path planning for autonomous information gathering," Autonomous Robots (2021) 45, Sep. 7, 2021, pp. 821-842, https://doi.org/10.1007/s10514-021-10012-x.

Leon et al., "TIGRE: Topological Graph based Robotic Exploration," 2017 European Conference on Mobile Robots (ECMR), Paris, France, 2017, pp. 1-6, doi: 10.1109/ECMR.2017.8098718.

Mendes et al., "ICP-based pose-graph SLAM," International Symposium on Safety, Security and Rescue Robotics (SSRR), Oct. 2016, pp. 195-200, 10.1109/SSRR.2016.7784298, hal-01522248.

Poncela et al., "Efficient integration of metric and topological maps for directed exploration of unknown environments," Robotics and Autonomous Systems, vol. 41, No. 1, Oct. 31, 2002, pp. 21-39, doi: 10.1016/S0921-8890(02)00272-5.

Tang, "Introduction to Robotics," The Wayback Machine,|https://web.archive.org/web/20160520085742/http://www.cpp.edu:80/~ftang/courses/CS521/, downloaded Feb. 3, 2023, 58 pages.

Thrun et al, "The GraphSLAM Algorithm with Applications to Large-Scale Mapping of UrbanStructures," The International Journal of Robotics Research, vol. 25, No. 5-6, May-Jun. 2006, pp. 403-429, doi: 10.1177/0278364906065387.

Video game, "Unreal Engine 5," https://docs.unrealengine.com/5.0/en-US/basic-navigation-in-unreal-engine/, downloaded Feb. 1, 2023, 15 pages.

Whelan et al, "ElasticFusion: Dense SLAM Without a Pose Graph," http://www.roboticsproceedings.org/rss11/p01.pdf, downloaded Feb. 1, 2023, 9 pages.

wikipedia.org, "Buffer (GIS)," http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.

wikipedia.org, "Probabilistic roadmap," https://en.wikipedia.org/wiki/Probabilistic_roadmap, downloaded Feb. 1, 2023, 2 pages.

wikipedia.org, "Rapidly-exploring random tree," https://en.wikipedia.org/wiki/Rapidly-exploring_random_tree, downloaded Feb. 1, 2023, 7 pages.

wikipedia.org, "Visibility graph," https://en.wikipedia.org/wiki/Visibility_graph, downloaded Feb. 1, 2023, 3 pages.

(56) References Cited

OTHER PUBLICATIONS

Yamauchi et al. "Place Recognition in Dynamic Environments," Journal of Robotic Systems, Special Issue on Mobile Robots, vol. 14, No. 2, Feb. 1997, pp. 107-120, https://doi.org/10.1002/(SICI)1097-4563(199702)14:2<107 ::AID-ROB5>3.0.CO;2-W.

Yamauchi et al. "Spatial Learning for Navigation in Dynamic Environments," IEEE Transactions onSystems, Man, and Cybernetics—Part B: Cybernetics, Special Issue on Learning Autonomous Robots, vol. 26, No. 3, Jun. 1996, pp. 496-505, doi: 10.1109/3477.499799.

Boston Dynamics, "Hey Buddy, Can You Give Me a Hand?," https://www.youtube.com/watch?v=fUyU3IKzoio, Feb. 12, 2018, downloaded Jul. 31, 2023.

Boston Dynamics, "Introducing Spot Classic (previously Spot)," https://www.youtube.com/watch?v=M8YjvHYbZ9w, Feb. 9, 2015, downloaded Aug. 10, 2023.

Boston Dynamics, "Introducing Spot (Previously SpotMini)," https://www.youtube.com/watch?v=tf7IEVTDjng, Jun. 23, 2016, downloaded Jul. 31, 2023.

Boston Dynamics, "Spot Autonomous Navigation," https://www.youtube.com/watch?v=Ve9kWX_KXus, May 10, 2018, downloaded Sep. 5, 2023.

Boston Dynamics, "Spot Robot Testing at Construction Sites,"|https://www.youtube.com/watch?v=wND9goxDVrY&t=15s, Oct. 11, 2018, downloaded Sep. 5, 2023.

Boston Dynamics, "SpotMini", The Wayback Machine,http://web.archive.org/web/20171118145237/https://bostondynamics.com/spot-mini, downloaded Jul. 31, 2023, 3 pages.

Boston Dynamics, "Testing Robustness," https://www.youtube.com/watch?v=aFuA50H9uek, Feb. 20, 2018, downloaded Jul. 31, 2023.

Boston Dynamics, "The New Spot," https://www.youtube.com/watch?v=kgaO45SyaO4, Nov. 13, 2017, downloaded Jul. 31, 2023.

Lee et al., "A New Semantic Descriptor for Data Association in Semantic SLAM", 2019 109th International Conference on Control, Automation and Systems (ICCAS), Jeju, Korea (South), Oct. 15, 2019; pp. 1178-1181, IEEE.

International Search Report and Written Opinion for PCT Application No. PCT/US2023/025806, Oct. 11, 2023, 16 pages.

Liu et al., "Behavior-based navigation system of mobile robot in unknown environment", Industrial Control Comp. Dec. 25, 2017; 12: 28-30.

Song et al., "Environment model based path planning for mobile robot", Electronics Optics & Control, Jun. 30, 2006, 3: 102-104.

Matsumaru T., Mobile robot with preliminary-announcement and display function of forthcoming motion using projection equipment. In Roman 2006—The 15th IEEE International Symposium on Robot and Human Interactive Communication Sep. 6, 2006 (pp. 443-450).

Wei et al., "A method of autonomous robot navigation in dynamic unknown environment", J Comp Res Devel. Sep. 30, 2005; 9: 1538-1543.

Wengefeld et al., "A laser projection system for robot intention communication and human robot interaction." In 2020 29th IEEE International Conference on Robot and Human Interactive Communication (RO-MAN) Aug. 31, 2020 (pp. 259-265).

Zhao et al., "Machine vision-based unstructured road navigation path detection method", Trans Chinese Soc Agricult Mach. Jun. 25, 2007; 6: 202-204. (English Abstract not available).

* cited by examiner

TOPOLOGY PROCESSING FOR WAYPOINT-BASED NAVIGATION MAPS

CROSS REFERENCE TO RELATED APPLICATIONS

This application claims priority under 35 U.S.C. § 119(e) to U.S. Provisional Application 63/202,286, filed on Jun. 4, 2021. The disclosure of this prior application is considered part of the disclosure of this application and is hereby incorporated by reference in its entirety.

TECHNICAL FIELD

This disclosure relates to topology processing for navigation maps.

BACKGROUND

Robotic devices navigate constrained environments to perform a variety of tasks or functions. To navigate through these constrained environments, the robotic devices may identify obstacles. Based on the identification of the obstacles, the robotic devices can navigate the constrained environment without contacting the obstacles.

SUMMARY

An aspect of the present disclosure provides a computer-implemented method that, when executed by data processing hardware causes the data processing hardware to perform operations. The operations include obtaining a topological map of an environment including a series of route waypoints and a series of route edges. Each route edge of the series of route edges topologically connects a corresponding pair of adjacent route waypoints in the series of route waypoints. The series of route edges are representative of traversable routes for a robot through the environment. The operations include determining, using the topological map and sensor data captured by the robot, one or more candidate alternate edges. Each of the one or more candidate alternate edges connects a corresponding pair of route waypoints of the series of route waypoints that are not connected by one of the route edges of the series of route edges. The operations include determining, using the sensor data captured by the robot, that the robot can traverse a candidate alternate edge of the one or more candidate alternate edges. The operations include confirming the candidate alternate edge of the one or more candidate alternate edges as an alternate edge based on determining that the robot can traverse the candidate alternate edge of the one or more candidate alternate edges. The operations include updating, using the alternate edge, the topological map.

In some implementations, the operations further include recording the series of route waypoints and the series of route edges using odometry data captured by the robot. One or more route waypoints of the series of route waypoints may be associated with a respective set of sensor data captured by the robot. In some examples, determining the one or more candidate alternate edges includes determining, using the topological map, a local embedding and determining that a total path length between a first route waypoint of the series of route waypoints and a second route waypoint of the series of route waypoints is less than a first threshold distance, the candidate alternate edge connecting the first route waypoint and the second route waypoint, and determining that a distance in the local embedding is less than a second threshold distance. The operations may include generating the candidate alternate edge between the respective route waypoint and the other route waypoint based on determining that the total path length between the first route waypoint and the second route waypoint is less than the first threshold distance and determining that the distance in the local embedding is less than the second threshold distance.

In some implementations, determining that the robot can traverse the candidate alternate edge includes determining that the robot can traverse the candidate alternate edge based on an output of a sensor data alignment algorithm. The sensor data alignment algorithm may include at least one of an iterative closest point algorithm, a feature-matching algorithm, a normal distribution transform algorithm, a dense image alignment algorithm, or a primitive alignment algorithm. In some cases, determining that the robot can traverse the candidate alternate edge may include determining, using the topological map, a local embedding, and determining that the robot can traverse the candidate alternate edge based on an output of a path collision checking algorithm performed on the local embedding. The path collision checking algorithm may include performing a circle sweep using a sweep line algorithm and the local embedding. In some examples, determining the one or more candidate alternate edges includes determining a local embedding using a fiducial marker.

In some implementations, updating, using the alternate edge, the topological map includes correlating one or more route waypoints of the series of route waypoints with a metric location. Updating, using the alternate edge, the topological map may include optimizing an embedding using sparse nonlinear optimization. In some examples, updating, using the alternate edge, the topological map includes refining the topological map to generate a refined topological map that is metrically consistent.

Another aspect of this disclosure provides a system. The system includes data processing hardware and memory hardware in communication with the data processing hardware. The memory hardware stores instructions that when executed on the data processing hardware cause the data processing hardware to perform operations. The operations include obtaining a topological map of an environment including a series of route waypoints and a series of route edges. Each route edge of the series of route edges topologically connects a corresponding pair of adjacent route waypoints in the series of route waypoints. The series of route edges are representative of traversable routes for a robot through the environment. The operations include determining, using the topological map and sensor data captured by the robot, one or more candidate alternate edges. Each of the one or more candidate alternate edges connects a corresponding pair of route waypoints of the series of route waypoints that are not connected by one of the route edges of the series of route edges. The operations include determining, using the sensor data captured by the robot, that the robot can traverse a candidate alternate edge of the one or more candidate alternate edges. The operations include confirming the candidate alternate edge of the one or more candidate alternate edges as an alternate edge based on determining that the robot can traverse the candidate alternate edge of the one or more candidate alternate edges. The operations include updating, using the confirmed alternate edge, the topological map.

In some implementations, the operations further include recording the series of route waypoints and the series of route edges using odometry data captured by the robot. One or more respective route waypoints of the series of route waypoints may be associated with a respective set of sensor data captured by the robot. In some examples, determining the one or more candidate alternate edges includes determining, using the topological map, a local embedding and determining that a total path length between a first route waypoint of the series of route waypoints and a second route waypoint of the series of route waypoints is less than a first threshold distance, the candidate alternate edge connecting the first route waypoint and the second route waypoint, and determining that a distance in the local embedding is less than a second threshold distance. The operations may include generating the candidate alternate edge between the respective route waypoint and the other route waypoint based on determining that the total path length between the first route waypoint and the second route waypoint is less than the first threshold distance and determining that the distance in the local embedding is less than the second threshold distance.

In some implementations, determining that the robot can traverse the candidate alternate edge includes determining that the robot can traverse the candidate alternate edge based on an output of a sensor data alignment algorithm. The sensor data alignment algorithm may include at least one of an iterative closest point algorithm, a feature-matching algorithm, a normal distribution transform algorithm, a dense image alignment algorithm, or a primitive alignment algorithm. In some cases, determining that the robot can traverse the candidate alternate edge may include determining, using the topological map, a local embedding determining that the robot can traverse the candidate alternate edge based on an output of a path collision checking algorithm performed on the local embedding. The path collision checking algorithm may include performing a circle sweep using a sweep line algorithm and the local embedding. In some examples, determining the one or more candidate alternate edges includes determining a local embedding using a fiducial marker.

In some implementations, updating, using the confirmed alternate edges, the topological map includes correlating one or more route waypoints of the series of route waypoints with a metric location. Optionally, updating, using the confirmed alternate edges, the topological map may include optimizing an embedding using sparse nonlinear optimization. In some examples, updating, using the confirmed alternate edges, the topological map includes refining the topological map to generate a refined topological map that is metrically consistent.

Yet another aspect of this disclosure provides a computer-implemented method that when executed by data processing hardware causes the data processing hardware to perform operations. The operations include obtaining a topological map of an environment including a series of route waypoints and a series of route edges. The operations include determining, using the topological map and sensor data captured by a robot, one or more candidate alternate edges. Further, the operations include determining, using the sensor data captured by the robot, that the robot can traverse a candidate alternate edge of the one or more candidate alternate edges.

In some implementations, one or more route edges of the series of route edges topologically connect a corresponding pair of adjacent route waypoints of the series of route waypoints. The series of route edges may represent one or more traversable routes for the robot through the environment. In some examples, each of the one or more candidate alternate edges potentially connects a corresponding pair of route waypoints that are not connected by one of the route edges of the series of route edges.

In some implementations, based on determining that the robot can traverse the candidate alternate edge, the candidate alternate edge is confirmed as an alternate edge. The operations may further include updating, using the alternate edge, the topological map.

An additional aspect of this disclosure provides a system. The system includes data processing hardware and memory hardware in communication with the data processing hardware. The memory hardware stores instructions that when executed on the data processing hardware cause the data processing hardware to perform operations. The operations include obtaining a topological map of an environment including a series of route waypoints and a series of route edges. The operations include determining, using the topological map and sensor data captured by a robot, one or more candidate alternate edges. Further, the operations include determining, using the sensor data captured by the robot, that the robot can traverse a candidate alternate edge of the one or more candidate alternate edges.

In some implementations, one or more route edges of the series of route edges topologically connect a corresponding pair of adjacent route waypoints of the series of route waypoints. The series of route edges may represent one or more traversable routes for the robot through the environment. In some examples, each of the one or more candidate alternate edges potentially connects a corresponding pair of route waypoints that are not connected by one of the route edges of the series of route edges.

In some implementations, based on determining that the robot can traverse the candidate alternate edge, the candidate alternate edge is confirmed as an alternate edge. The operations may further include updating, using the alternate edge, the topological map.

In another aspect, a robot is disclosed. The robot includes a computing system configured to store a topological map of an environment including a series of route waypoints topologically connected by a series of route edges indicating traversable routes for the robot through the environment. The robot further includes a sensor configured to capture sensor data. The computing system is configured to generate one or more candidate alternate edges based on the topological map and the sensor data. In certain implementations, the computing system is further configured to verify the robot can transverse the one or more candidate alternate edges based on the sensor data, and to update the topological map based on the one or more candidate alternate edges. In certain implementations, the robot further includes a plurality of joints, and the computing system is further configured to control one or more of the plurality of joints to move the robot through the environment based on the updated topological map.

The details of the one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Autonomous and semi-autonomous robots may be equipped with complex mapping, localization, and navigation systems. These systems may utilize navigation-graphs, and in order for the robot to localize accurately, the robot may rely on these navigation graphs being accurate. However, due to odometry drift, localization error, etc., the topology (e.g., relationships between waypoints) of the navigation graph may be inaccurate. Relying on an operator to disambiguate graph topology is error-prone and difficult. An automated algorithm for correcting the navigation graph topology based on sensor data would be advantageous.

Implementations herein are directed toward systems and methods for verifying that a topological map (e.g., a map of waypoints and one or more edges connecting waypoints) is consistent (e.g., that any two places on the graph that are reachable by the robot are connected by a path) and that the topological map does not contain edges (e.g., paths) that are not traversable by the robot. These implementations improve robot navigation performance by, for example, allowing the robot to take shorter paths through its environment and allowing for merging of related sensor data for localization.

Figure 1A:
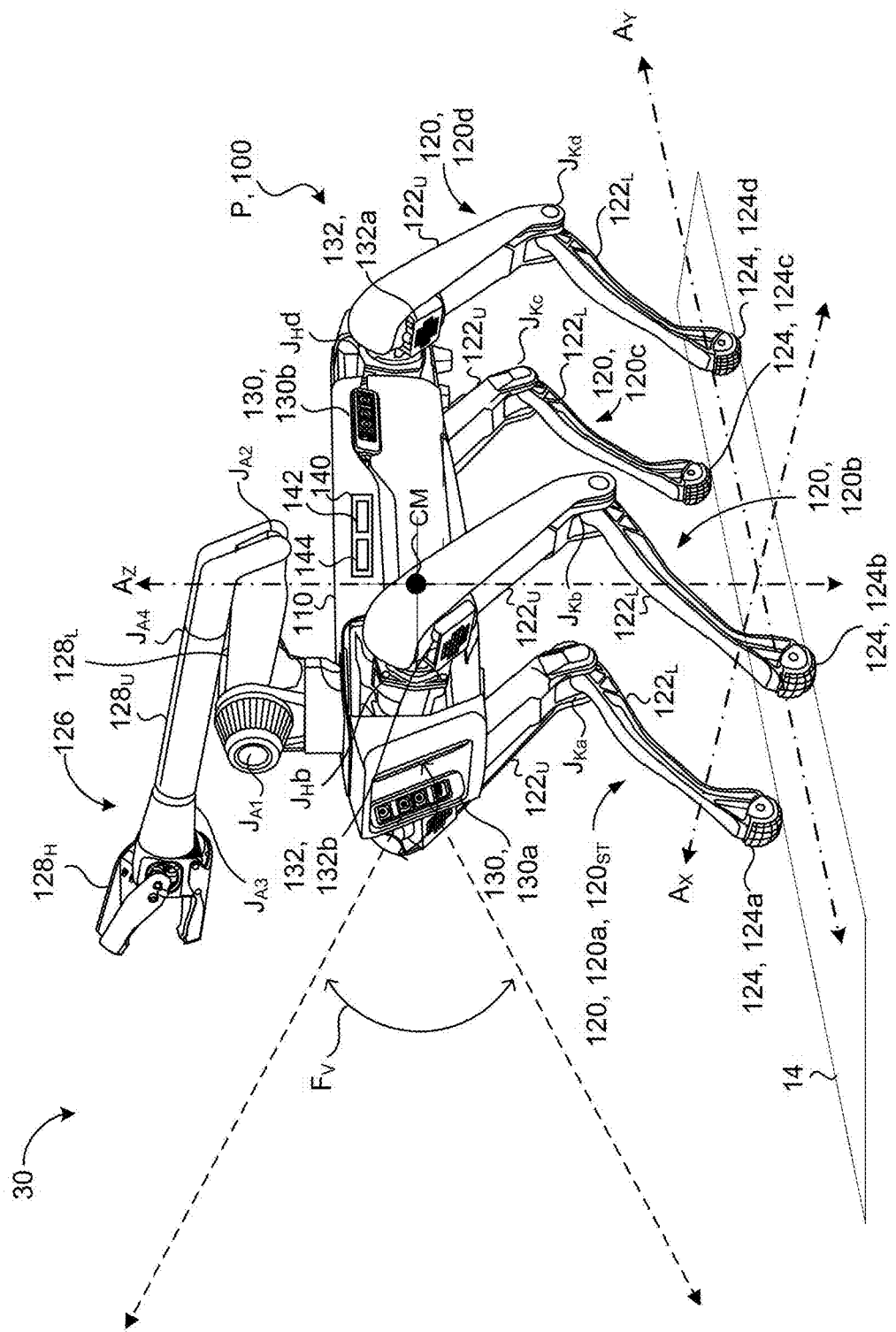
FIG. 1A is a schematic view of an example robot for navigating an environment.
Figure 1B:
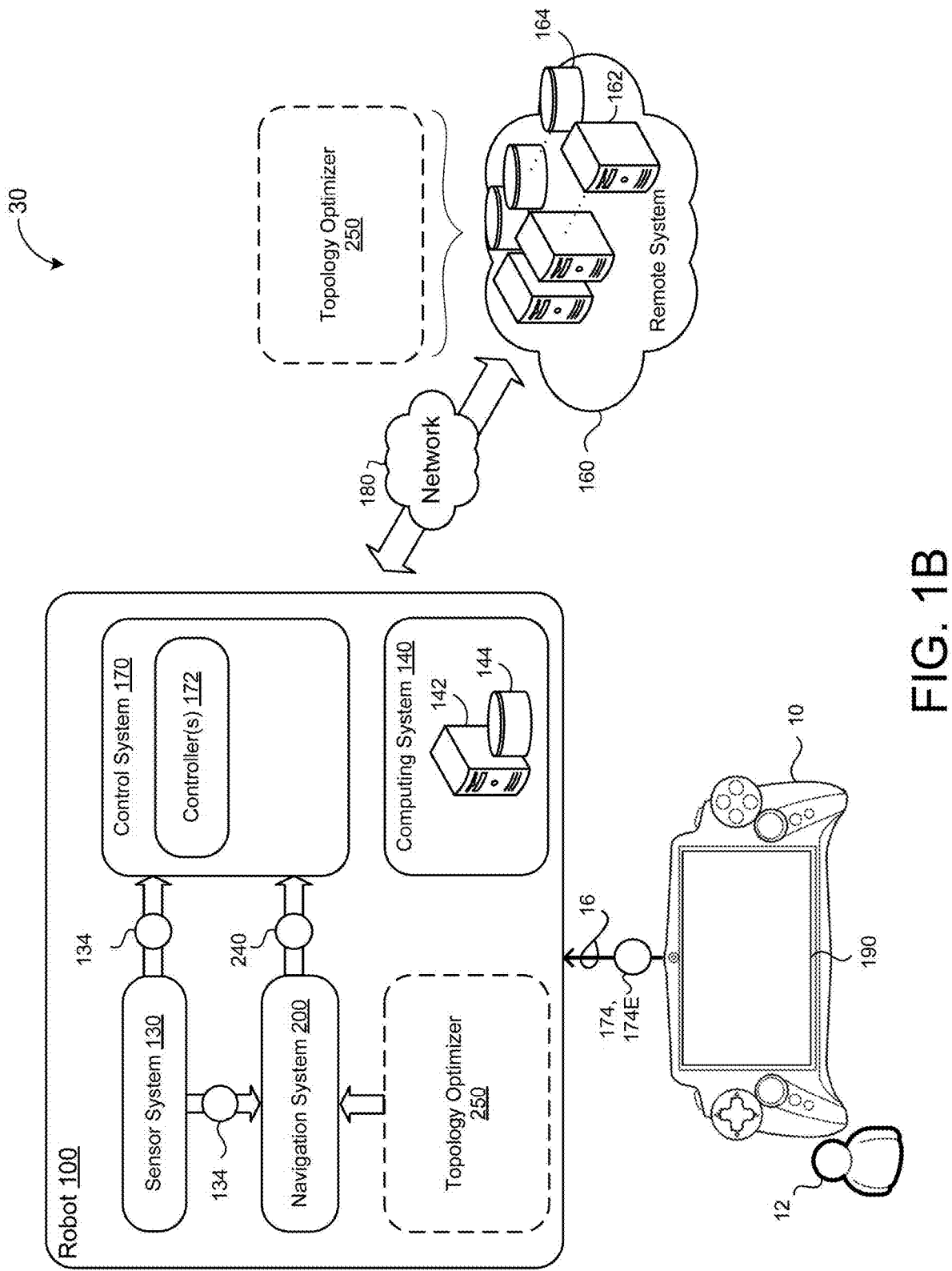
FIG. 1B is a schematic view of a navigation system for navigating the robot of FIG. 1A.

Referring to FIGS. 1A and 1B, in some implementations, a robot 100 includes a body 110 with one or more locomotion-based structures such as legs 120a-d coupled to the body 110 that enable the robot 100 to move within an environment 30 that surrounds the robot 100. In some examples, all or a portion of the legs 120 are an articulable structure such that one or more joints J permit members 122 of the leg 120 to move. For instance, in the illustrated embodiment, all or a portion of the legs 120 include a hip joint $J_H$ coupling an upper member 122, 122U of the leg 120 to the body 110 and a knee joint $J_K$ coupling the upper member 122U of the leg 120 to a lower member 122L of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 30.

In order to traverse the terrain, all or a portion of the legs 120 may have a distal end 124 that contacts a surface of the terrain (e.g., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end of the leg includes an ankle joint such that the distal end is articulable with respect to the lower member of the leg.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1 depicts the arm 126 with three members 128 corresponding to a lower member $128_L$, an upper member $128_U$, and a hand member $128_H$ (also referred to as an end-effector). Here, the lower member $128_L$ may rotate or pivot about a first arm joint Jai located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ is a mechanical gripper that includes a moveable jaw and a fixed jaw configured to perform different types of grasping of elements within the environment 30. In the example shown, the hand member $128_H$ includes a fixed first jaw and a moveable second jaw that grasps objects by clamping the object between the jaws. The moveable jaw is configured to move relative to the fixed jaw to move between an open position for the gripper and a closed position for the gripper (e.g., closed around an object). In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 attaches or detaches from the robot 100 depending on whether the arm 126 is desired for particular operations.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (e.g., a point where the weighted relative position of the distributed mass of the robot 100 sums to zero). The robot 100 further has a pose P based on the CM relative to the vertical gravitational axis $A_Z$ (e.g., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (e.g., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move within the environment 30. Another anatomical plane of the robot 100 is the frontal plane that extends across the body 110 of the robot 100 (e.g., from a right side of the robot 100 with a first leg 120a to a left side of the robot 100 with a second leg 120b). The frontal plane spans the X-Z plane by extending in directions of the x-direction axis $A_X$ and the z-direction axis $A_Z$.

In order to maneuver within the environment 30 or to perform tasks using the arm 126, the robot 100 includes a sensor system 130 with one or more sensors 132, 132a— n. For example, FIG. 1A illustrates a first sensor 132, 132a mounted at a head of the robot 100 (near a front portion of the robot 100 adjacent the front legs 120a—b), a second sensor 132, 132b mounted near the hip of the second leg 120b of the robot 100, a third sensor 132, 132c corresponding to one of the sensors 132 mounted on a side of the body 110 of the robot 100, a fourth sensor 132, 132d mounted near the hip of the fourth leg 120d of the robot 100, and a fifth sensor 132, 132e mounted at or near the hand member $128_H$ of the arm 126 of the robot 100. The sensors 132 may include vision/image sensors, inertial sensors (e.g., an inertial measurement unit (IMU)), force sensors, and/or kinematic sensors. For example, the sensors 132 may include one or more of a camera (e.g., a stereo camera), a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the first sensor 132, 132a of the robot 100. Each sensor 132 may be pivotable and/or rotatable such that the sensor 132, for example, changes the field of view $F_V$ about one or more axis (e.g., an x-axis, a y-axis, or a z-axis in relation to a ground plane). In some examples, multiple sensors 132 may be clustered together (e.g., similar to the first sensor 132a) to stitch a larger field of view $F_V$ than any single sensor 132. With multiple sensors 132 placed about the robot 100, the sensor system 130 may have a 360 degree view or a nearly 360 degree view of the surroundings of the robot 100 about vertical and/or horizontal axes.

When surveying a field of view $F_V$ with a sensor 132 (see, e.g., FIG. 1B), the sensor system 130 generates sensor data 134 (e.g., image data) corresponding to the field of view $F_V$. The sensor system 130 may generate the field of view $F_V$ with a sensor 132 mounted on or near the body 110 of the robot 100 (e.g., sensor(s) 132a, 132b). The sensor system may additionally and/or alternatively generate the field of view $F_V$ with a sensor 132 mounted at or near the hand member $128_H$ of the arm 126 (e.g., sensor(s) 132c). The one or more sensors 132 capture the sensor data 134 that defines the three-dimensional point cloud for the area within the environment 30 of the robot 100. In some examples, the sensor data 134 is image data that corresponds to a three-dimensional volumetric point cloud generated by a three-dimensional volumetric image sensor 132. Additionally or alternatively, when the robot 100 is maneuvering within the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 of the robot 100. In other words, the sensor system 130 may communicate the sensor data 134 from one or more sensors 132 to any other system of the robot 100 in order to assist the functionality of that system.

In some implementations, the sensor system 130 includes sensor(s) 132 coupled to a joint J. Moreover, these sensors 132 may couple to a motor M that operates a joint J of the robot 100 (e.g., sensors 132). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $126_H$ relative to another member of the arm 126 or robot 100), joint speed, joint angular velocity, joint angular acceleration, and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 or 128 coupled at a joint J) and systems of the robot 100 perform further processing to derive velocity and/or acceleration from the positional data. In other examples, a sensor 132 is configured to measure velocity and/or acceleration directly.

With reference to FIG. 1B, as the sensor system 130 gathers sensor data 134, a computing system 140 stores, processes, and/or to communicates the sensor data 134 to various systems of the robot 100 (e.g., the control system 170, a navigation system 200, a topology optimizer 250, and/or remote controller 10). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remote from the robot 100. For instance, the computing system 140 communicates via a network 180 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 reside on resources of the remote system 160. In some examples, the topology optimizer 250 is executed on the data processing hardware 142 local to the robot, while in other examples, the topology optimizer 250 is executed on the data processing hardware 162 that is remote from the robot 100.

In some implementations, as shown in FIGS. 1A and 1B, the robot 100 includes a control system 170. The control system 170 may be configured to communicate with systems of the robot 100, such as the at least one sensor system 130, the navigation system 200, and/or the topology optimizer 250. The control system 170 may perform operations and other functions using hardware 140. The control system 170 includes at least one controller 172 that is configured to control the robot 100. For example, the controller 172 controls movement of the robot 100 to traverse the environment 30 based on input or feedback from the systems of the robot 100 (e.g., the sensor system 130 and/or the control system 170). In additional examples, the controller 172 controls movement between poses and/or behaviors of the robot 100. At least one the controller 172 may be responsible for controlling movement of the arm 126 of the robot 100 in order for the arm 126 to perform various tasks using the hand member $128_H$. For instance, at least one controller 172 controls the hand member $128_H$ (e.g., a gripper) to manipulate an object or element in the environment 30. For example, the controller 172 actuates the movable jaw in a direction towards the fixed jaw to close the gripper. In other examples, the controller 172 actuates the movable jaw in a direction away from the fixed jaw to close the gripper.

A given controller 172 of the control system 170 may control the robot 100 by controlling movement about one or more joints J of the robot 100. In some configurations, the given controller 172 is software or firmware with programming logic that controls at least one joint J or a motor M which operates, or is coupled to, a joint J. A software application (a software resource) may refer to computer software that causes a computing device to perform a task. In some examples, a software application may be referred to as an "application," an "app," or a "program." For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform a behavior with some movements, a controller 172 may be configured to control movement of multiple parts of the robot 100 such as, for example, two legs 120a—b, four legs 120a-d, or two legs 120a— b combined with the arm 126. In some examples, a controller 172 is configured as an object-based controller that is set up to perform a particular behavior or set of behaviors for interacting with an interactable object.

With continued reference to FIG. 1B, an operator 12 (also referred to herein as a user or a client) may interact with the robot 100 via the remote controller 10 that communicates with the robot 100 to perform actions. For example, the operator 12 transmits commands 174 to the robot 100 (executed via the control system 170) via a wireless communication network 16. Additionally, the robot 100 may communicate with the remote controller 10 to display an image on a user interface 190 (e.g., UI 190) of the remote controller 10. For example, the UI 190 is configured to display the image that corresponds to three-dimensional field of view $F_V$ of the one or more sensors 132. The image displayed on the UI 190 of the remote controller 10 is a two-dimensional image that corresponds to the three-dimensional point cloud of sensor data 134 (e.g., field of view $F_V$) for the area within the environment 30 of the robot 100. That is, the image displayed on the UI 190 may be a two-dimensional image representation that corresponds to the three-dimensional field of view $F_V$ of the one or more sensors 132.

Figure 2:
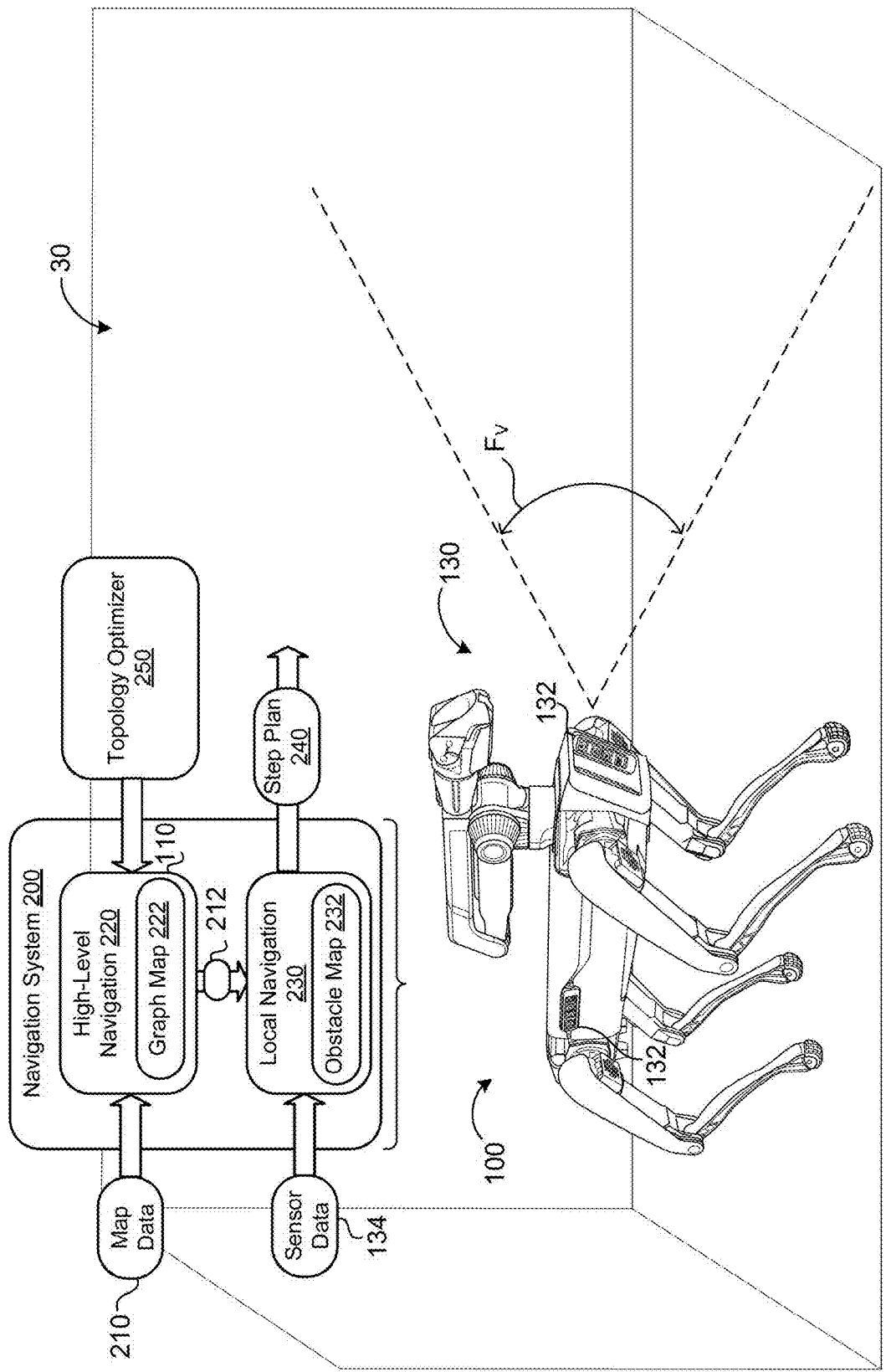
FIG. 2 is a schematic view of exemplary components of the navigation system.

Referring now to FIG. 2, the robot 100 (e.g., the data processing hardware 142) executes the navigation system 200 for enabling the robot 100 to navigate the environment 30. The sensor system 130 includes one or more sensors 132 (e.g., image sensors, LIDAR sensors, LADAR sensors, etc.) that can each capture sensor data 134 of the environment 30 surrounding the robot 100 within the field of view $F_V$. For example, the one or more sensors 132 may be one or more cameras. The sensor system 130 may move the field of view $F_V$ by adjusting an angle of view or by panning and/or tilting (either independently or via the robot 100) one or more sensors 132 to move the field of view $F_V$ in any direction. In some implementations, the sensor system 130 includes multiple sensors 132 (e.g., multiple cameras) such that the sensor system 130 captures a generally 360-degree field of view around the robot 100.

Figure 3A:
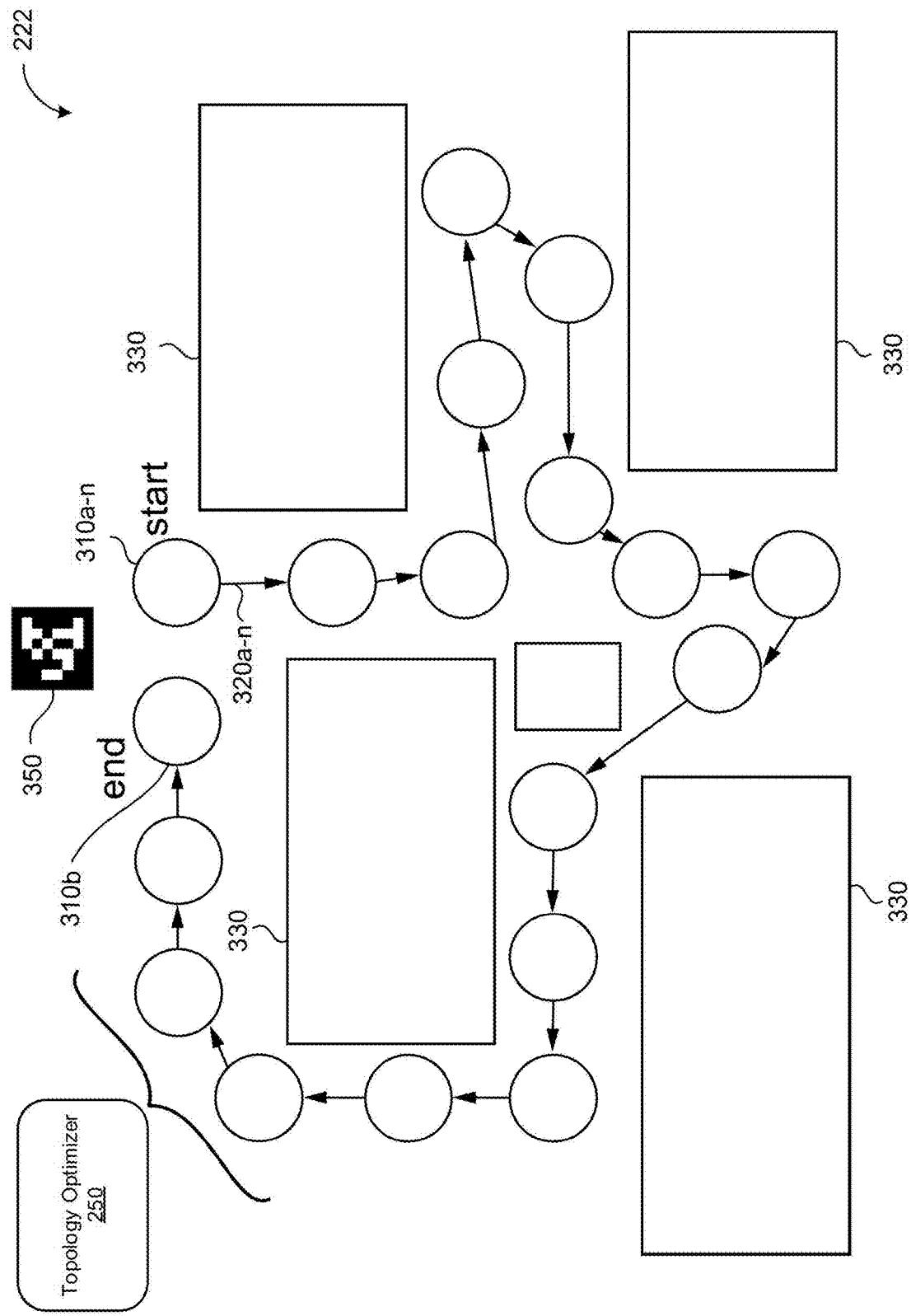
FIG. 3A is a schematic view of a topological map.
Figure 3B:
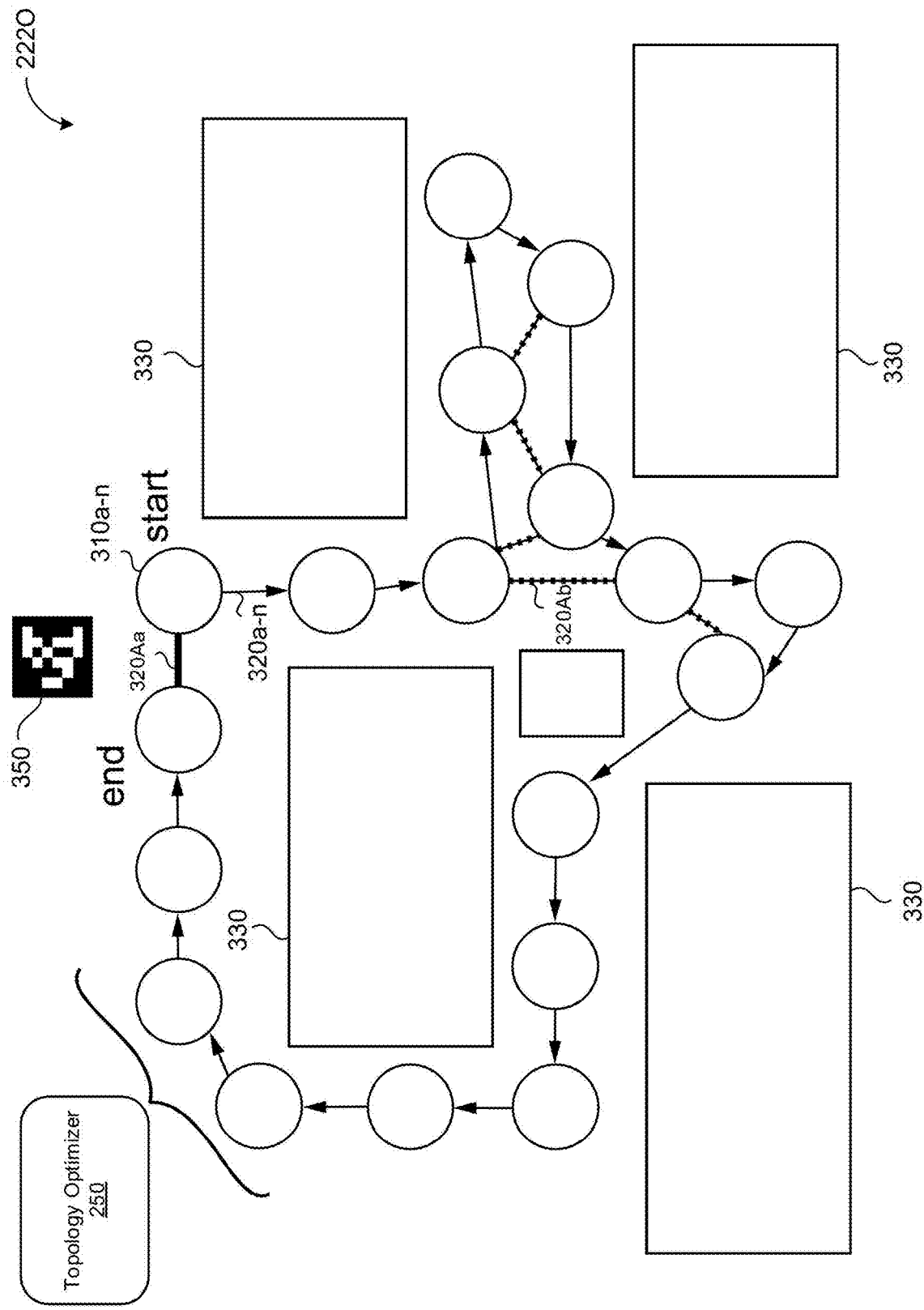
FIG. 3B is a schematic view of a topological map.

In the example of FIG. 2, the navigation system 200 includes a high-level navigation module 220 that receives map data 210 (e.g., high-level navigation data representative of locations of static obstacles in an area the robot 100 is to navigate). In some cases, the map data 210 includes a graph map 222. In other cases, the high-level navigation module 220 generates the graph map 222. The graph map 222 may include a topological map of a given area the robot 100 is to traverse. The high-level navigation module 220 can obtain (e.g., from the remote system 160 or the remote controller 10 or the topology optimizer 250) and/or generate a series of route waypoints (As shown in FIGS. 3A and 3B) on the graph map 222 for a navigation route 212 that plots a path around large and/or static obstacles from a start location (e.g., the current location of the robot 100) to a destination. Route edges may connect corresponding pairs of adjacent route waypoints. In some examples, the route edges record geometric transforms between route waypoints based on odometry data (e.g., odometry data from motion sensors or image sensors to determine a change in the robot's position over time). The route waypoints 310 and the route edges 312 may be representative of the navigation route 212 for the robot 100 to follow from a start location to a destination location.

As discussed in more detail below, in some examples, the high-level navigation module 220 receives the map data 210, the graph map 222, and/or an optimized graph map 222 from the topology optimizer 250. The topology optimizer 250, in some examples, is part of the navigation system 200 and executed locally or remote to the robot 100.

In some implementations, the high-level navigation module 220 produces the navigation route 212 over a greater than 10-meter scale (e.g., the navigation route 212 may include distances greater than 10 meters from the robot 100). The navigation system 200 also includes a local navigation module 230 that can receive the navigation route 212 and the image or sensor data 134 from the sensor system 130. The local navigation module 230, using the sensor data 134, can generate an obstacle map 232. The obstacle map 232 may be a robot-centered map that maps obstacles (static and/or dynamic obstacles) in the vicinity (e.g., within a threshold distance) of the robot 100 based on the sensor data 134. For example, while the graph map 222 may include information relating to the locations of walls of a hallway, the obstacle map 232 (populated by the sensor data 134 as the robot 100 traverses the environment 30) may include information regarding a stack of boxes placed in the hallway that were not present during the original recording. The size of the obstacle map 232 may be dependent upon both the operational range of the sensors 132 and the available computational resources.

The local navigation module 230 can generate a step plan 240 (e.g., using an A*search algorithm) that plots all or a portion of the individual steps (or other movements) of the robot 100 to navigate from the current location of the robot 100 to the next route waypoint 310 along the navigation route 212. Using the step plan 240, the robot 100 can maneuver through the environment 30. The local navigation module 230 may obtain a path for the robot 100 to the next route waypoint 310 using an obstacle grid map based on the captured sensor data 134. In some examples, the local navigation module 230 operates on a range correlated with the operational range of the sensor 132 (e.g., four meters) that is generally less than the scale of high-level navigation module 220.

Referring now to FIG. 3A, in some examples, the topology optimizer 250 obtains the graph map 222 (e.g., a topological map) of an environment 30. For example, the topology optimizer 250 receives the graph map 222 from the navigation system 200 (e.g., the high-level navigation module 220) or generates the graph map 222 from map data 210 and/or sensor data 134. The graph map 222 includes a series of route waypoints 310a-n and a series of route edges 320a-n. Each route edge in the series of route edges 320a-n topologically connects a corresponding pair of adjacent route waypoints in the series of route waypoints 310a-n. Each route edge represents a traversable route for the robot 100 through an environment of a robot. The map may also include information representing one or more obstacles 330 that mark boundaries where the robot may be unable to traverse (e.g., walls and static objects). In some cases, the graph map 222 may not include information regarding the spatial relationship between route waypoints. The robot may record the series of route waypoints 310a-n and the series of route edges 320a-n using odometry data captured by the robot as the robot navigates the environment. The robot may record sensor data at all or a portion of the route waypoints such that all or a portion of the route waypoints are associated with a respective set of sensor data captured by the robot (e.g., a point cloud). In some implementations, the graph map 222 includes information related to one or more fiducial markers 350. The one or more fiducial markers 350 may correspond to an object that is placed within the field of sensing of the robot that the robot may use as a fixed point of reference. The one or more fiducial markers 350 may be any object that the robot 100 is capable of readily recognizing, such as a fixed or stationary object or feature of the environment or an object with a recognizable pattern or feature. For example, a fiducial marker 350 may include a bar code, QR-code, or other pattern, symbol, and/or shape for the robot to recognize.

In some cases, the robot may navigate along valid route edges and may not navigate along between route waypoints that are not linked via a valid route edge. Therefore, some route waypoints may be located (e.g., metrically, geographically, physically, etc.) within a threshold distance (e.g., five meters, three meters, etc.) without the graph map 222 reflecting a route edge between the route waypoints. In the example of FIG. 3A, the route waypoint 310a and the route waypoint 310b are within a threshold distance (e.g., a threshold distance in physical space (e.g., reality), Euclidean space, Cartesian space, and/or metric space, but the robot, when navigating from the route waypoint 310a to the route waypoint 310b may navigate the entire series of route edges 320a—n due to the lack of a route edge connecting the route waypoints 310a, 310b. Therefore, the robot may determine, based on the graph map 222, that there is no direct traversable path between the route waypoints 310a, 310b. The topological map 222 may represent the route waypoints 310 in global (e.g., absolute positions) and/or local positions where positions of the route waypoints are represented in relation to one or more other route waypoints. The route waypoints may be assigned Cartesian or metric coordinates, such as 3D coordinates (x, y, z translation) or 6D coordinates (x, y, z translation and rotation).

Referring now to FIG. 3B, in some implementations, the topology optimizer 250 determines, using the topological map 222 and sensor data captured by the robot, one or more candidate alternate edges 320Aa, 320Ab. Each of the one or more candidate alternate edges 320Aa, 320Ab can connect a corresponding pair of the series of route waypoints 310a-n that may not be connected by one of the series of route edges 320a-n. As is discussed in more detail below, for all or a portion of the respective candidate alternate edges 320Aa, 320Ab, the topology optimizer 250 can determine, using the sensor data captured by the robot, whether the robot can traverse the respective candidate alternate edge 320Aa, 320Ab without colliding with an obstacle 330. Based on the topology optimizer 250 determining that the robot 100 can traverse the respective candidate alternate edge 320Aa, 320Ab without colliding with an obstacle 330, the topology optimizer 250 can confirm the respective candidate edge 320Aa and/or 320Ab as a respective alternate edge. In some examples, after confirming and/or adding the alternate edges to the topological map 222, the topology optimizer 250 updates, using nonlinear optimization (e.g., finding the minimum of a nonlinear cost function), the topological map 222 using information gleaned from the confirmed alternate edges. For example, the topology optimizer 250 may add and refine the confirmed alternate edges to the topological map 222 and use the additional information provided by the alternate edges to optimize, as discussed in more detail below, the embedding of the map in space (e.g., Euclidean space and/or metric space). Embedding the map in space may include assigning coordinates (e.g., 6D coordinates) to one or more route waypoints. For example, embedding the map in space may include assigning coordinates (x1, y1, z1) in meters with rotations (r1, r2, r3) in radians). In some cases, all or a portion of the route waypoints may be assigned as set of coordinates. Optimizing the embedding may include finding the coordinates for one or more route waypoints so that the series of route waypoints 310*a-n* of the topological map 222 are globally consistent. In some examples, the topology optimizer 250 optimizes the topology map 222 in real-time (e.g., as the robot collects the sensor data). In other examples, the topology optimizer 250 optimizes the topological map 222 after the robot collects all or a portion of the sensor data.

In this example, the optimized topological map 2220 includes several alternate edges 320Aa, 320Ab. One or more of the alternate edges 320Aa, 320Ab, such as the alternate edge 320Aa may be the result of a "large" loop closure (e.g., by using one or more fiducial markers 350), while other alternate edges 320Aa, 320Ab, such as the alternate edge 320Ab may be the result of a "small" loop closure (e.g., by using odometry data). In some examples, the topology optimizer 250 uses the sensor data to align visual features (e.g., a fiducial marker 350) captured in the data as a reference to determine candidate loop closures. It is understood that the topology optimizer 250 may extract features from any sensor data (e.g., non-visual features) to align. For example, the sensor data may include radar data, acoustic data, etc. For example, the topology processor may use any sensor data that includes features (e.g., with a uniqueness value exceeding or matching a threshold uniqueness value).

Figure 4:
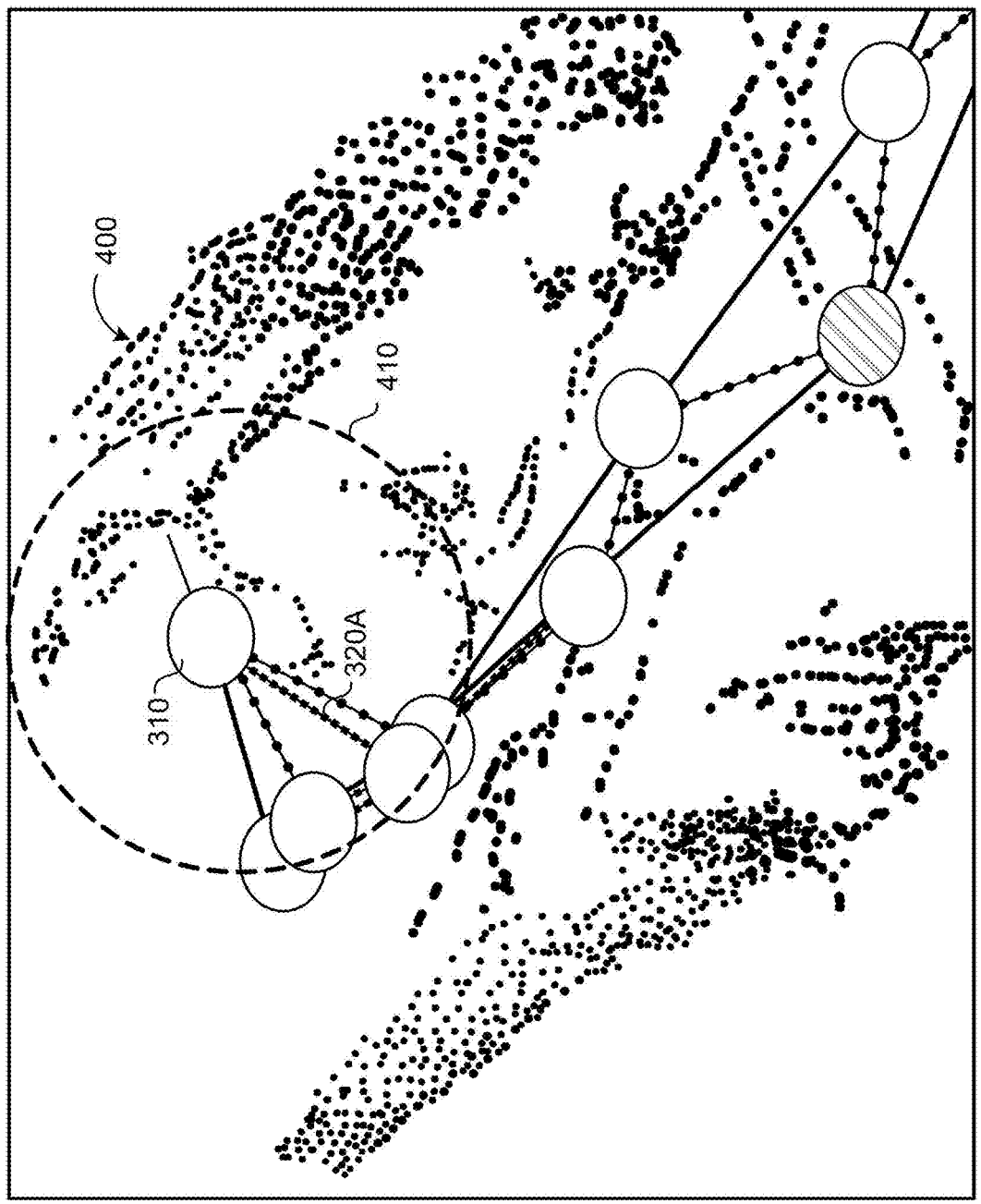
FIG. 4 is a schematic view of an exemplary topological map and candidate alternate edges.

Referring now to FIG. 4, in some implementations, for one or more route waypoints 310, a topology optimizer determines, using a topological map, a local embedding 400 (e.g., an embedding of a waypoint relative to another waypoint). For example, the topology optimizer may represent positions or coordinates of the one or more route waypoints 310 relative to one or more other route waypoints 310 rather than representing positions of the route waypoints 310 globally. The local embedding 400 may include a function that transforms the set of route waypoints 310 into one or more arbitrary locations in a metric space. The local embedding 400 may compensate for not knowing the "true" or global embedding (e.g., due to error in the route edges from odometry error). In some examples, the topology optimizer determines the local embedding 400 using a fiducial marker. For at least one of the one or more route waypoints 310, the topology optimizer can determine whether a total path length between the route waypoint and another route waypoint is less than a first threshold distance 410. In some examples, the topology optimizer can determine whether a distance in the local embedding 400 is less than a second threshold distance, which may be the same or different than the first threshold distance 410. Based on the topology optimizer determining that the total path length between the route waypoint and the other route waypoint is less than the first threshold distance 410 and/or the distance in the local embedding 400 is less than the second threshold distance, the topology optimizer may generate a candidate alternate edge 320A between the route waypoint and the other route waypoint.

Figure 5A:
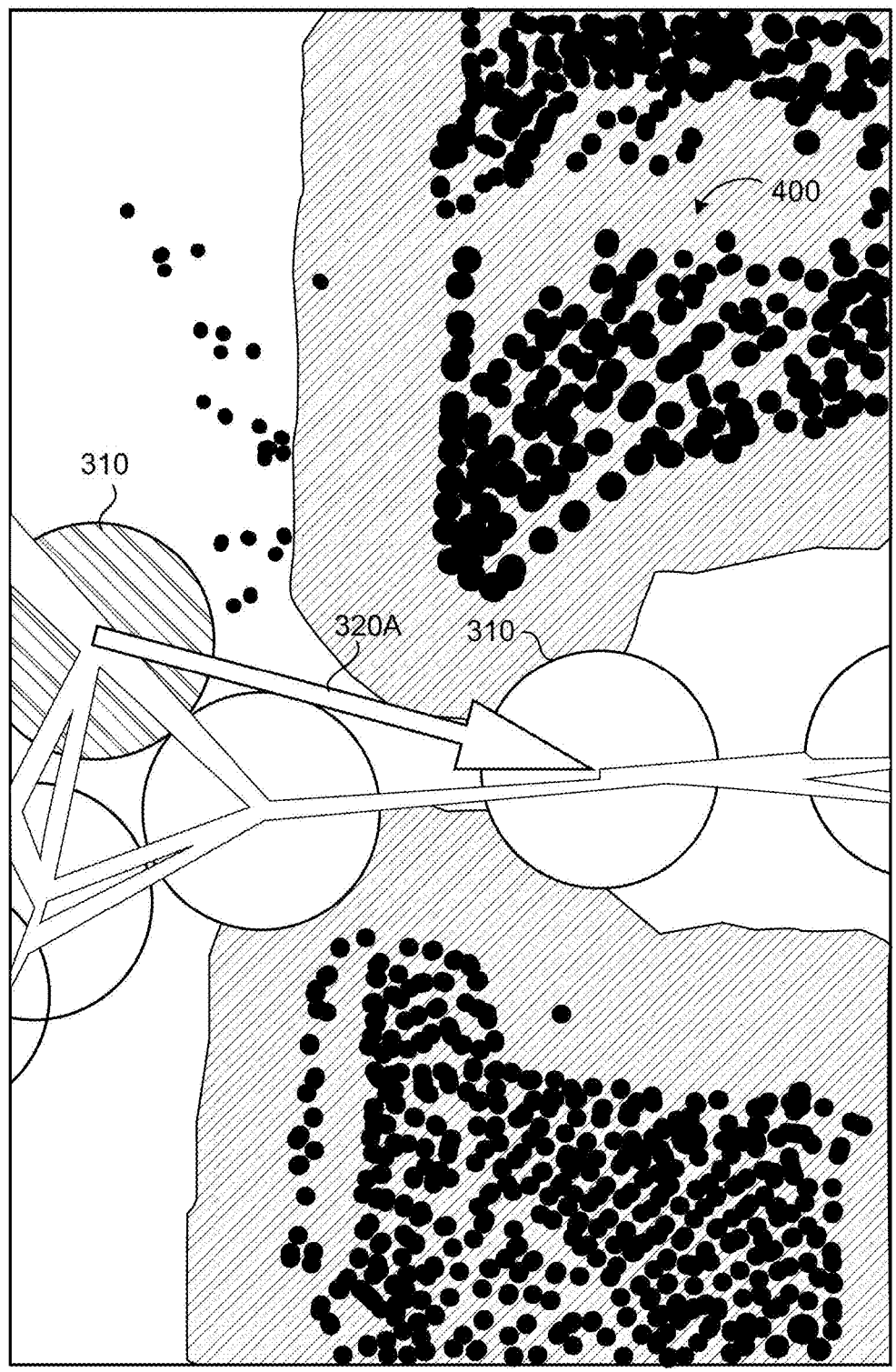
FIG. 5A is a schematic view of confirmation of candidate alternate edges.

Referring now to FIG. 5A, in some examples, the topology optimizer uses and/or applies a path collision checking algorithm (e.g., path collision checking technique). For example, the topology optimizer may use and/or apply the path collision checking algorithm by performing a circle sweep of the candidate alternate edge 320A in the local embedding 400 using a sweep line algorithm, to determine whether a robot can traverse the respective candidate alternate edge 320A without colliding with an obstacle. In some examples, the sensor data associated with all or a portion of the route waypoints 310 includes a signed distance field. The topology optimizer, using the signed distance field, may use a circle sweep algorithm or any other path collision checking algorithm, along with the local embedding 400 and the candidate alternate edge 320A. If, based on the signed distance field and local embedding 400, the candidate alternate edge 320A experiences a collision (e.g., with an obstacle), the topology optimizer may reject the candidate alternate edge 320A.

Figure 5B:
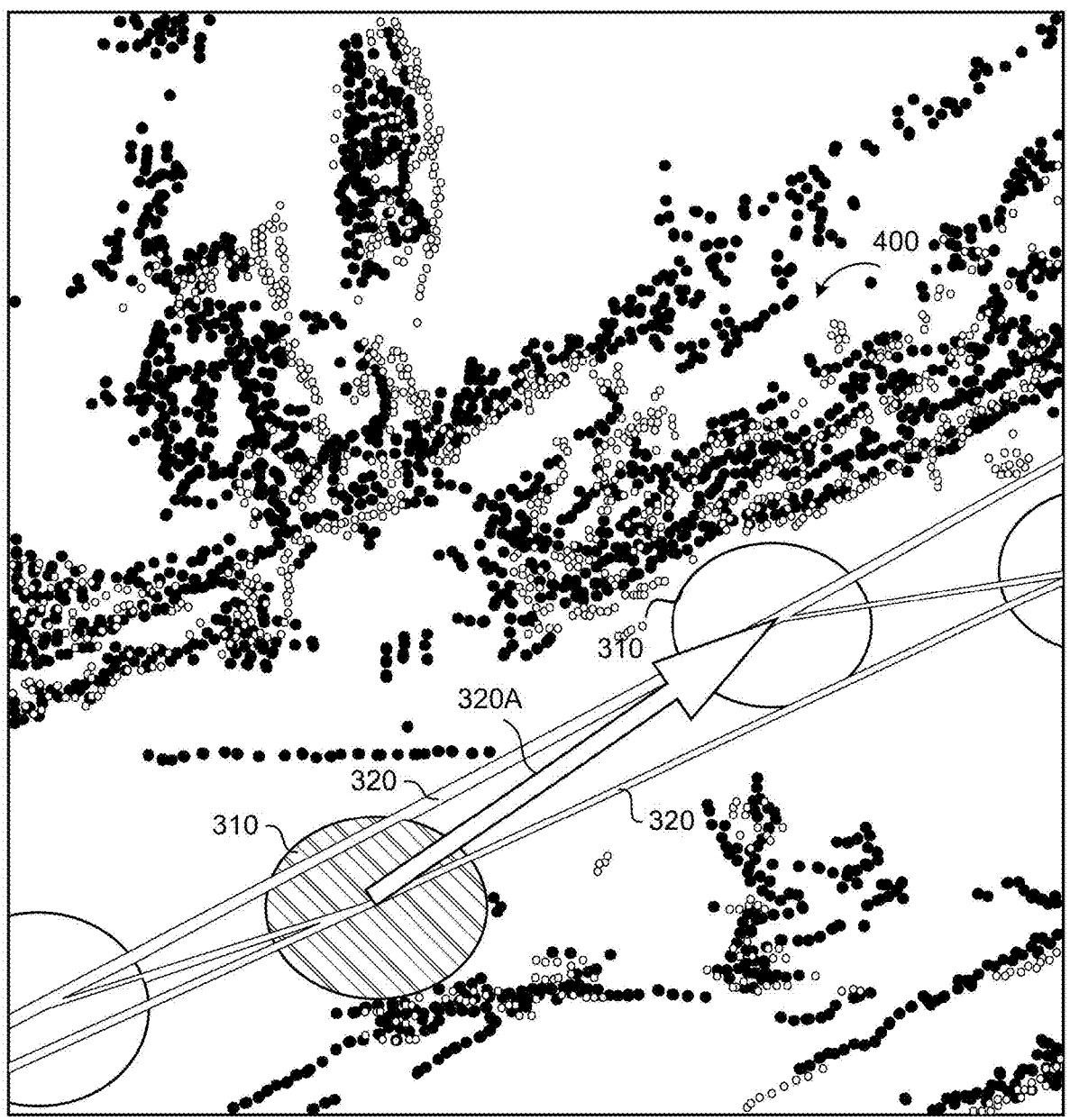
FIG. 5B is a schematic view of confirmation of candidate alternate edges.

Referring now to FIG. 5B, in some examples, the topology optimizer uses/applies a sensor data alignment algorithm (e.g., an iterative closest point (ICP) algorithm a feature-matching algorithm, a normal distribution transform algorithm, a dense image alignment algorithm, a primitive alignment algorithm, etc.) to determine whether the robot 100 can traverse the respective candidate alternate edge 320A without colliding with an obstacle. For example, the topology optimizer may use the sensor data alignment algorithm with two respective sets of sensor data (e.g., point clouds) captured by the robot at the two respective route waypoints 310 using the local embedding 400 as the seed for the algorithm. The topology optimizer may use the result of the sensor data alignment algorithm as a new edge transformation for the candidate alternate edge 320A. If the topology optimizer determines the sensor data alignment algorithm fails, the topology optimizer may reject the candidate alternate edge 320A (e.g., not confirm the candidate alternate edge 320A as an alternate edge).

Figure 6A:
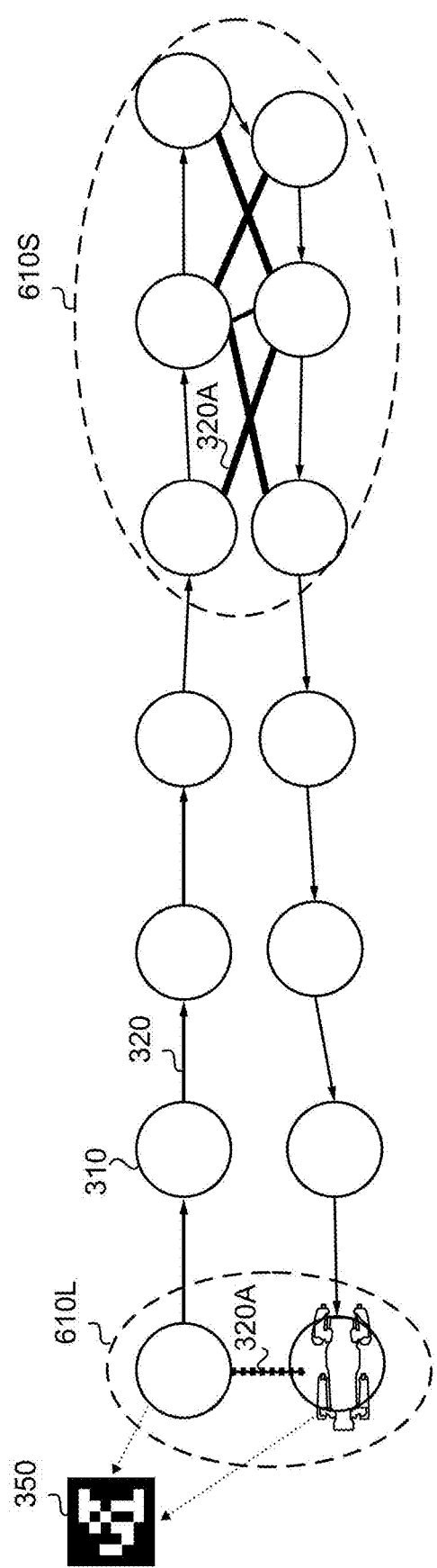
FIG. 6A is a schematic view of a large loop closure.
Figure 6B:
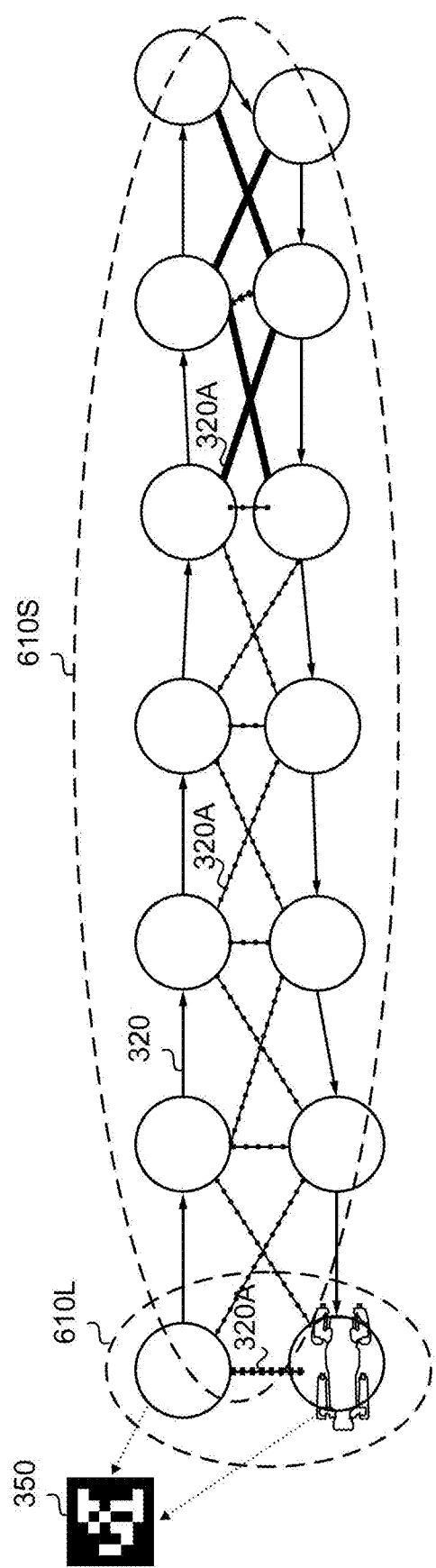
FIG. 6B is a schematic view of a small loop closure.

Referring now to FIG. 6A, in some implementations, the topology optimizer determines one or more candidate alternate edges 320A using "large" loop closures 610L. For example, the topology optimizer uses a fiducial marker 350 for an embedding to close large loops (e.g., loops that include a chain of multiple route waypoints 310 connected by corresponding route edges 320) by aligning or correlating the fiducial marker 350 from the sensor data of all or a portion of the respective route waypoints 310. To determine the remaining candidate alternate edges 320A, the topology optimizer may use "small" loop closure 610S using odometry data to determine candidate alternate edges 320A for local portions of a topological map. As illustrated in FIG. 6B, in some examples, the topology optimizer iteratively determines the candidate alternate edges 320A by performing multiple small loop closures 610S, as each loop closure may add additional information when a new confirmed alternate edge 320A is added.

Figure 7A:
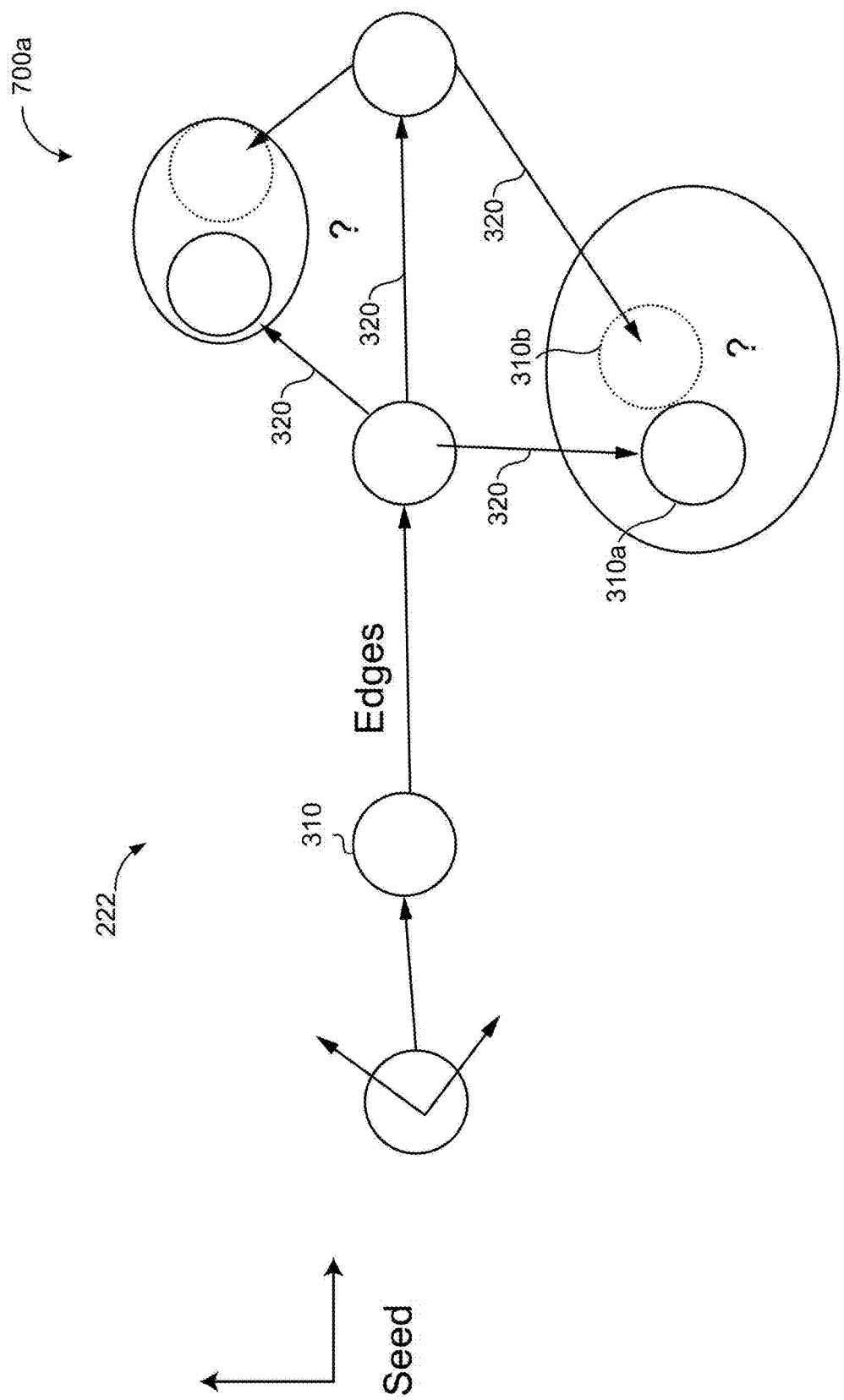
FIG. 7A is a schematic view of a metrically inconsistent topological map.
Figure 7B:
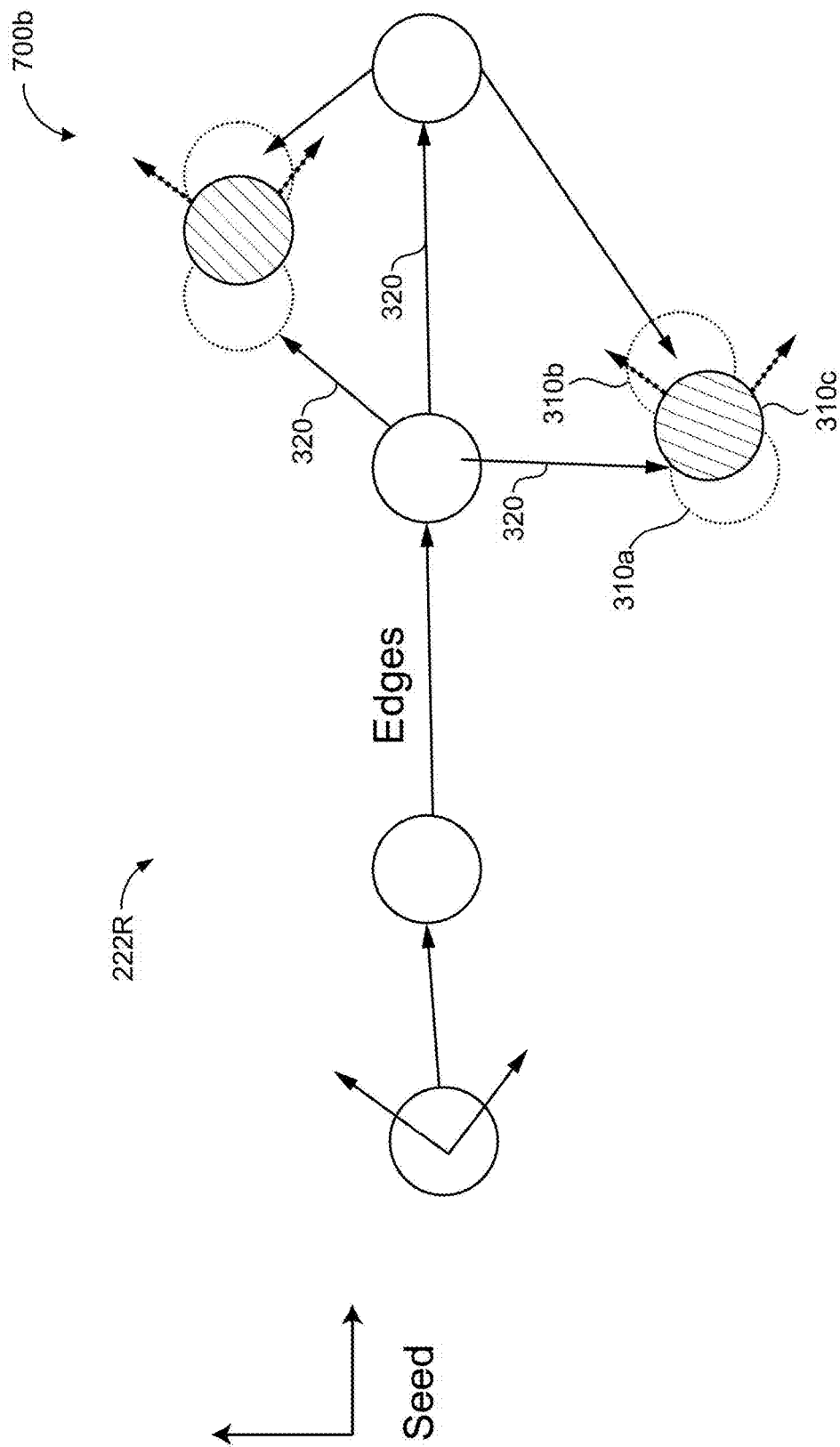
FIG. 7B is a schematic view of a metrically consistent topological map.

Referring now to FIGS. 7A and 7B, a topological map 222 (e.g., topological maps used by autonomous and semi-autonomous robots) may not be metrically consistent. A topological map 222 may be metrically consistent if, for any pair of route waypoints 310, a robot can follow a path of route edges 320 from the first route waypoint 310 of the pair to the second route waypoint 310 of the pair. For example, a topological map 222 may be metrically consistent if each route waypoint 310 of the topological map 222 is associated with a set of coordinates that this is consistent with each path of routes edges 320 from another route waypoint 310 to the route waypoint 310. Additionally, for one or more paths in an embedding, the resulting position/orientation of the first route waypoint 310 with respect to the second route waypoint 310 (and vice versa) may be the same as the relative position/orientation of route waypoints of one or more other paths. When the topological map 222 is not metrically consistent, the embeddings may be misleading and/or inefficient to draw correctly. Metric consistency may be affected by processes that lead to odometry drift and localization error. For example, while individual route edges 320 may be accurate as compared to an accuracy threshold value, the accumulation of small error over a large number of route edges 320 over time may not be accurate as compared to an accuracy threshold value.

A schematic view 700a of FIG. 7A illustrates an exemplary topological map 222 that is not metrically consistent as it includes inconsistent edges (e.g., due to odometry error) that results in multiple possible embeddings. While the route waypoints 310a, 310b may be metrically in the same location (or metrically within a particular threshold value of the same location), the topological map 222, due to odometry error from the different route edges 320, may include the route waypoints 310a, 310b at different locations which may cause the topological map 222 to be metrically inconsistent.

Figure 8A:
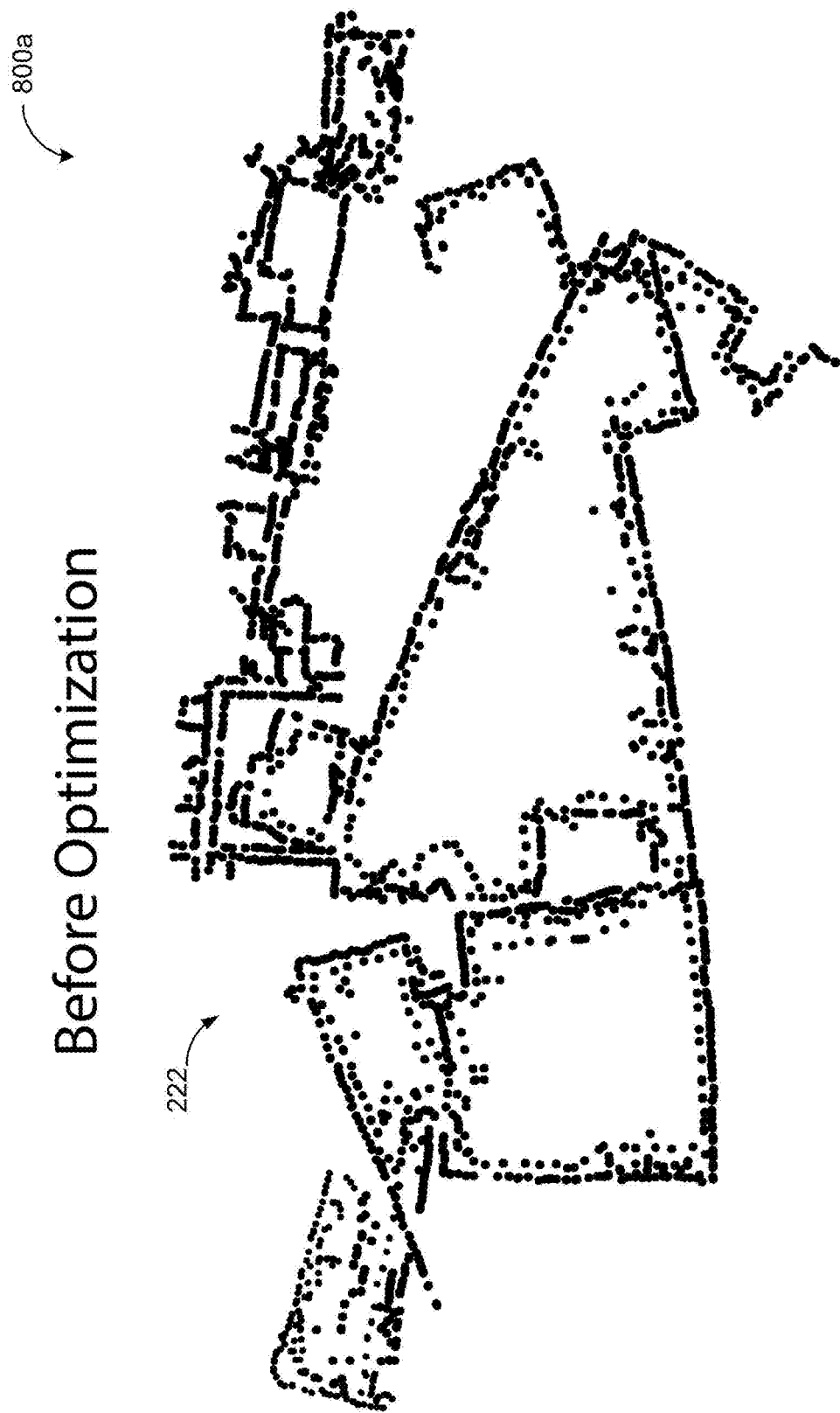
FIG. 8A is a schematic view of a metrically inconsistent topological map.
Figure 8B:
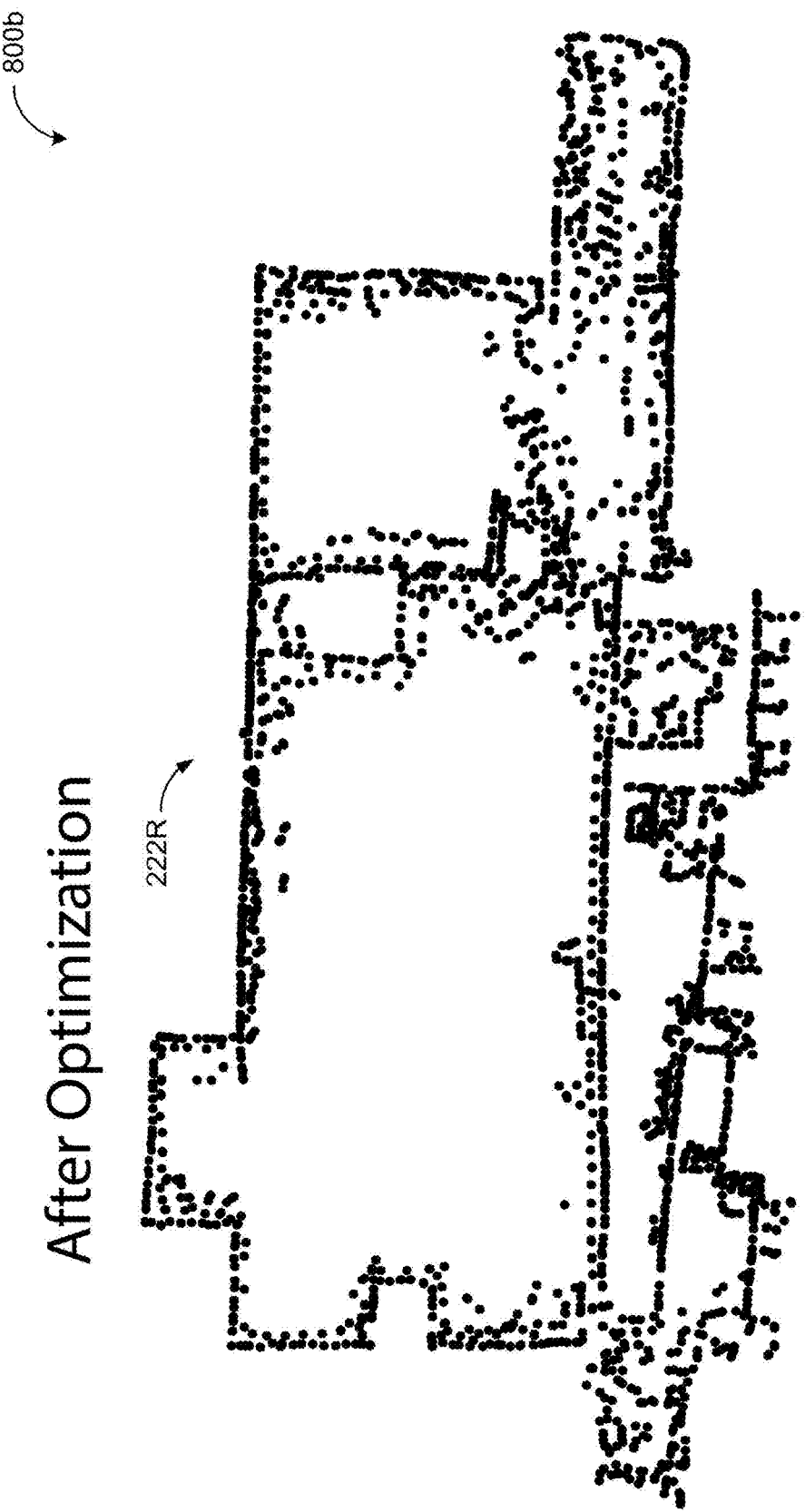
FIG. 8B is a schematic view of a metrically consistent topological map.

Referring now to FIG. 7B, in some implementations, a topology optimizer refines the topological map 222 to obtain a refined topological map 222R that is metrically consistent. For example, a schematic view 700b includes a refined topological map 222R where the topology optimizer has averaged together the contributions from all or a portion of the route edges 320 in the embedding. Averaging together the contributions from all or a portion of the route edges 320 may implicitly optimize the sum of squared error between the embeddings and the implied relative location of the route waypoints 310 from their respective neighboring route waypoints 310. The topology optimizer may merge or average the metrically inconsistent route waypoints 310a, 310b into a single metrically consistent route waypoint 310c. In some implementations, the topology optimizer determines a embedding (e.g., a Euclidean embedding) using sparse nonlinear optimization. For example, the topology optimizer may identify a global metric embedding (e.g., an optimized global metric embedding) for all or a portion of the route waypoints 310 such that a particular set of coordinates are identified for each route waypoint using sparse nonlinear optimization. FIG. 8A includes a schematic view 800a of an exemplary topological map 222 prior to optimization. The topological map 222 is metrically inconsistent and may be difficult to understand for a human viewer. In contrast, FIG. 8B includes a schematic view 800b of a refined topological map 222R based on the topology optimizer optimizing the topological map 222 of FIG. 8A. The refined topological map 222R may be metrically consistent (e.g., all or a portion of the paths may cross topologically in the embedding) and may appear more accurate to a human viewer.

Figure 9:
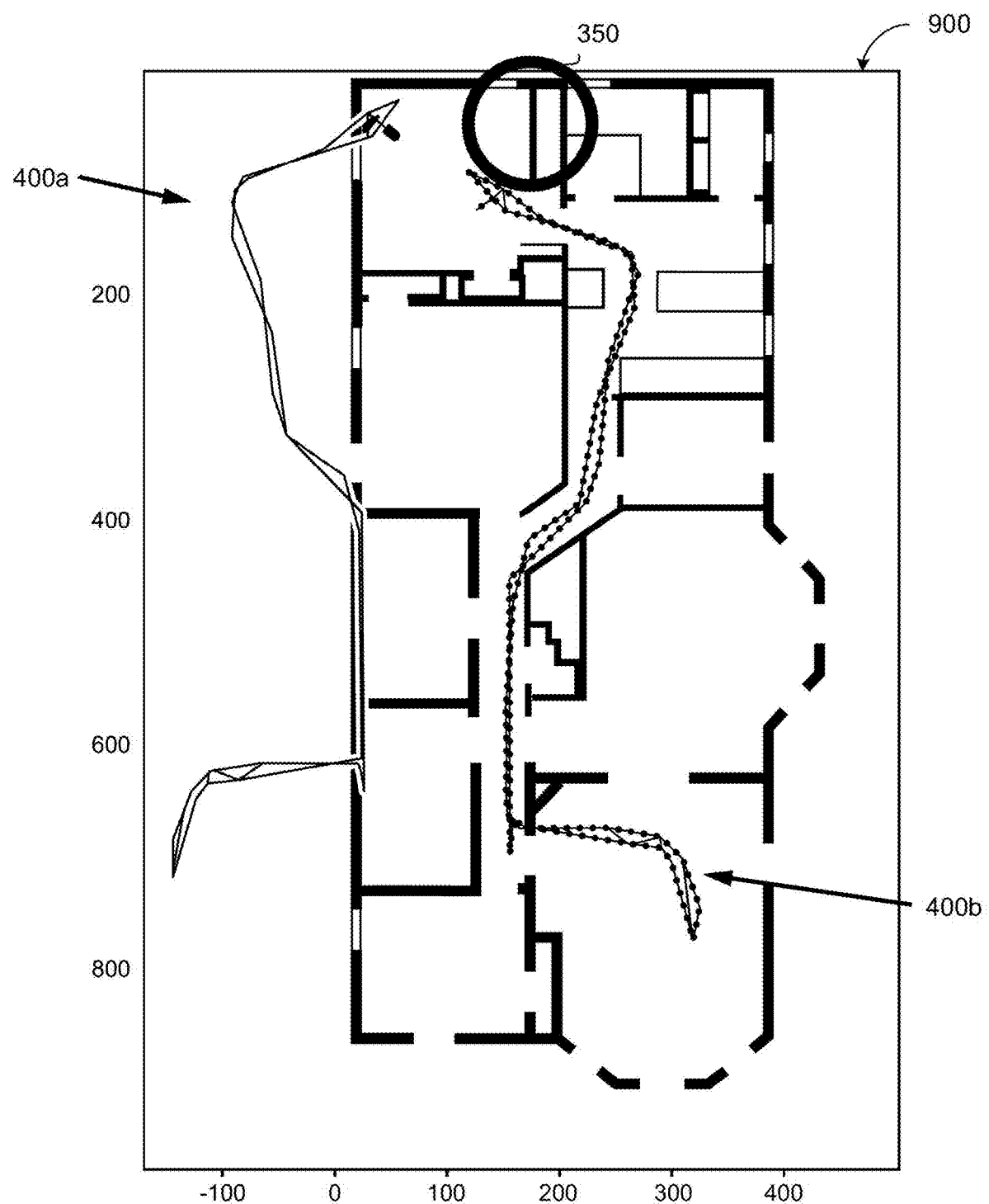
FIG. 9 is a schematic view of an embedding aligned with a blueprint.

Referring now to FIG. 9, in some examples, the topology optimizer updates the topological map 222 using all or a portion of confirmed candidate alternate edge by correlating one or more route waypoints with a specific metric location. In the example of FIG. 9, a user computing device has provided an "embedding" (e.g., an anchoring) of a metric location for the robot by correlating a fiducial marker 350 with a location on a blueprint 900. Without the provided embedding, the default embedding 400a may not align with the blueprint 900 (e.g., may not align with a metric or physical space). However, based on the provided embedding, the topology optimizer may generate the optimized embedding 400b which aligns with the blueprint 900. The user may embed or anchor or "pin" route waypoints to the embedding by using one or more fiducial markers 350 (or other distinguishable features in the environment). For example, the user may provide the topology optimizer with data to tie one or more route waypoints to respective specific locations (e.g., metric locations, physical locations, and/or geographical locations) and optimize the remaining route waypoints and route edges. Therefore, the topology optimizer may optimize the remaining route waypoints based on the embedding. The topology optimizer may use costs connecting two route waypoints or embeddings or costs/constraints on individual route waypoints. For example, the topology optimizer 250 may constrain a gravity vector for all or a portion of the route waypoint embeddings to point upward by adding a cost on the dot product between the gravity vector and the "up" vector.

Thus, implementations herein include a topology optimizer that, in some examples, performs both odometry loop closure (e.g., small loop closure) and fiducial loop closure (e.g., large loop closure) to generated candidate alternate edges. The topology optimizer may verify or confirm all or a portion of the candidate alternate edges by, for example, performing collision checking using signed distance fields and refinement and rejection sampling using visual features. The topology optimizer may iteratively refine the topological map based up confirmed alternate edged and optimize the topological map using an embedding of the graph given the confirmed alternate edges (e.g., using sparse nonlinear optimization). By reconciling the topology of the environment, the robot is able to navigate around obstacles and obstructions more efficiently and is be able to disambiguate localization between spaces that are supposed to be topologically connected automatically.

Figure 10:
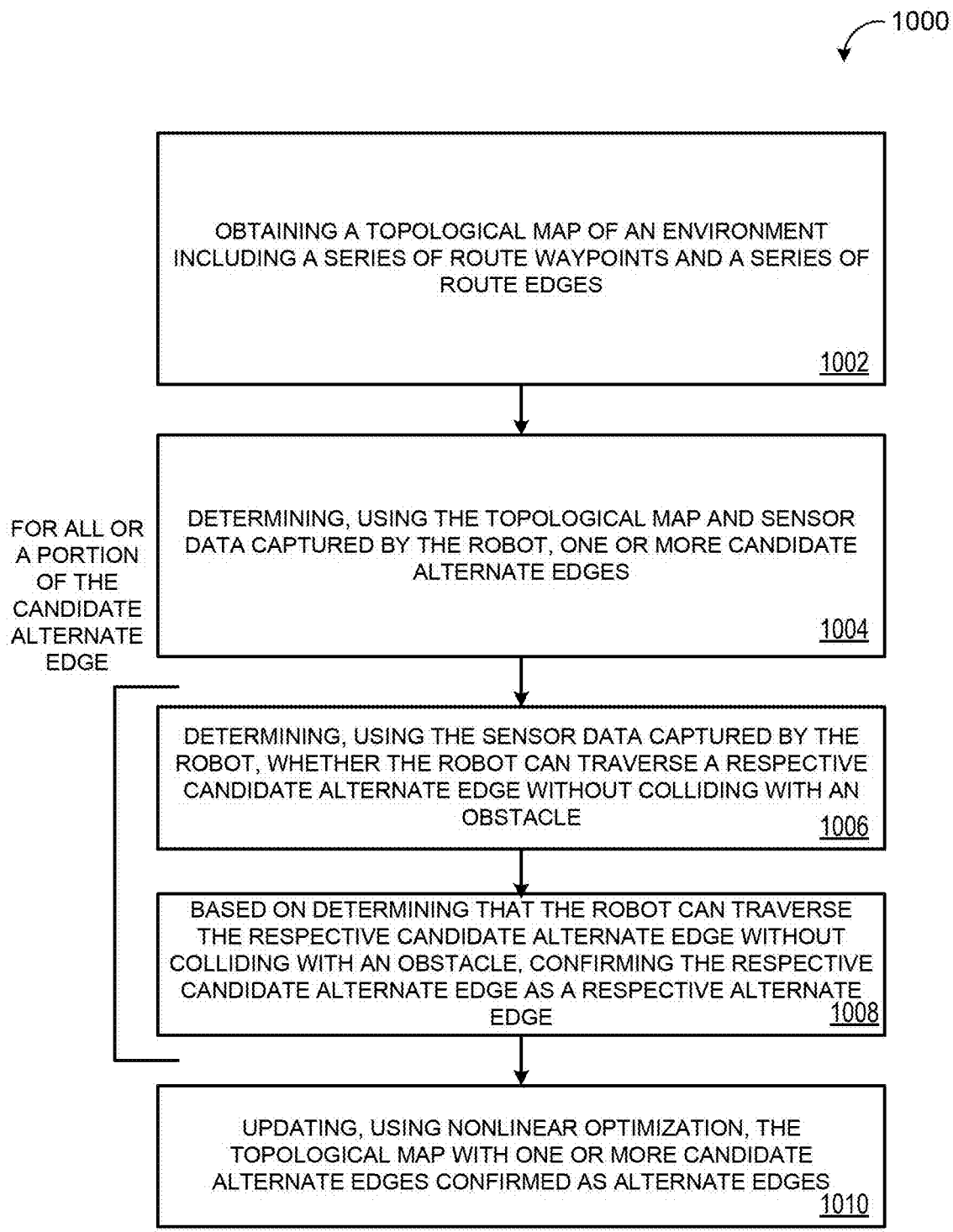
FIG. 10 is a flowchart of an example arrangement of operations for a method of automatic topology processing for waypoint-based navigation maps.

FIG. 10 is a flowchart of an exemplary arrangement of operations for a method 1000 of automatic topology processing for waypoint-based navigation maps. The computer-implemented method 1000, when executed by data processing hardware causes the data processing hardware to perform operations. At operation 1002, the method 1000 includes obtaining a topological map of an environment that includes a series of route waypoints and a series of route edges. Each route edge in the series of route edges can topologically connect a corresponding pair of adjacent route waypoints in the series of route waypoints. The series of route edges may be representative of traversable routes for a robot through the environment.

The method 1000, at operation 1004, includes determining, using the topological map and sensor data captured by the robot, one or more candidate alternate edges. All or a portion of the one or more candidate alternate edges may potentially connect a corresponding pair of route waypoints that may not be connected by one of the route edges in the series of route edges. At operation 1006, the method 1000 includes, for all or a portion of the one or more candidate alternate edges, determining, using the sensor data captured by the robot, whether the robot can traverse a respective candidate alternate edge without colliding with an obstacle. Based on determining that the robot can traverse the respective candidate alternate edge without colliding with an obstacle, the method 1000 includes, at operation 1008, confirming the respective candidate alternate edge as a respective alternate edge. At operation 1010, the method 1000 includes updating, using nonlinear optimization, the topological map with one or more candidate alternate edges confirmed as alternate edges.

Figure 11:
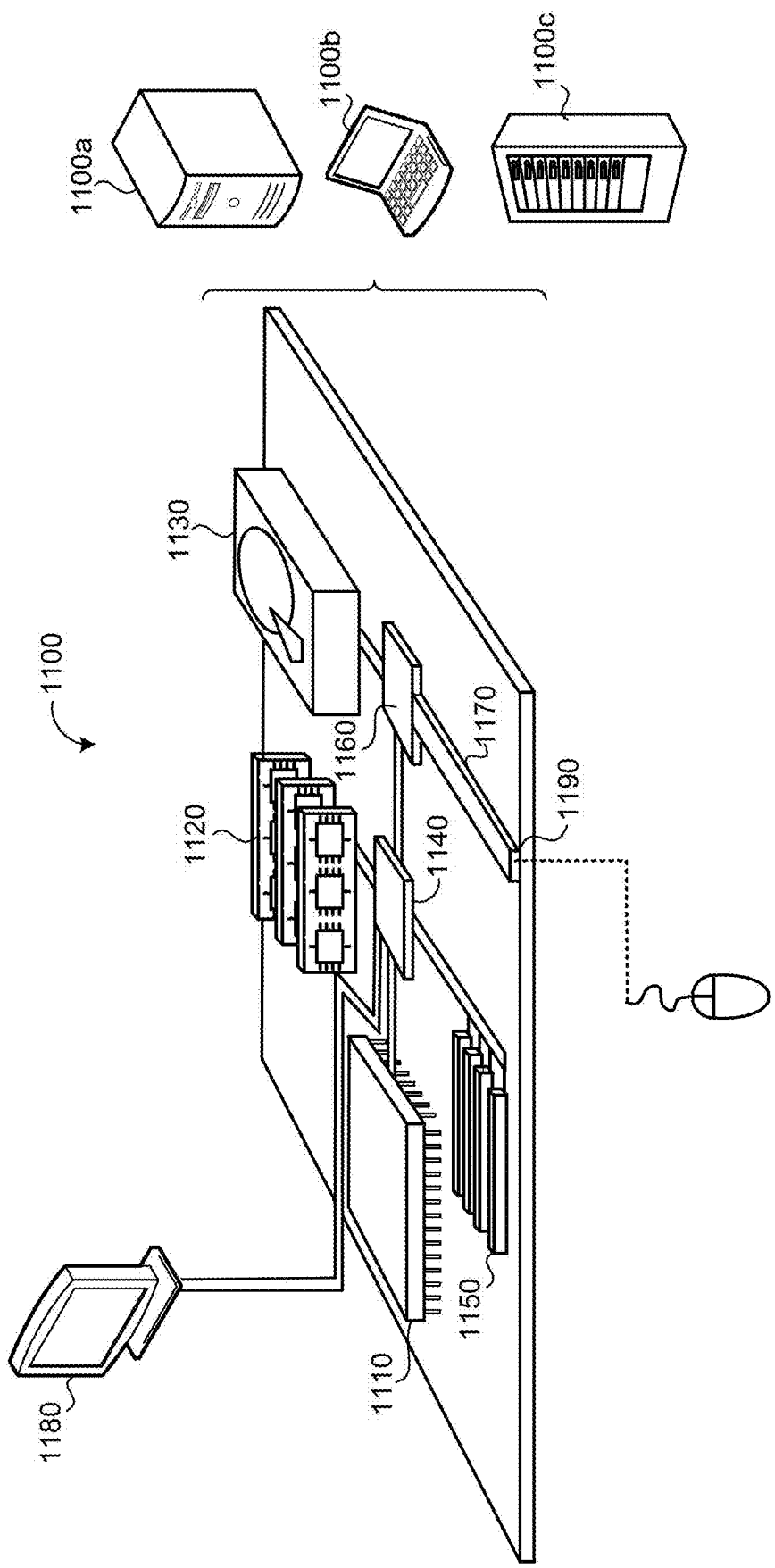
FIG. 11 is a schematic view of an example computing device that may be used to implement the systems and methods described herein.

FIG. 11 is schematic view of an example computing device 1100 that may be used to implement the systems and methods described in this document. The computing device 1100 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1100 includes a processor 1110, memory 1120, a storage device 1130, a high-speed interface/controller 1140 connecting to the memory 1120 and high-speed expansion ports 1150, and a low speed interface/controller 1160 connecting to a low speed bus 1170 and a storage device 1130. Each of the components 1110, 1120, 1130, 1140, 1150, and 1160, are interconnected using various busses, and may be mounted on a common motherboard or in other manners as appropriate. The processor 1110 can process instructions for execution within the computing device 1100, including instructions stored in the memory 1120 or on the storage device 1130 to display graphical information for a graphical user interface (GUI) on an external input/output device, such as display 1180 coupled to high speed interface 1140. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1120 stores information non-transitorily within the computing device 1100. The memory 1120 may be a computer-readable medium, a volatile memory unit(s), or non-volatile memory unit(s). The non-transitory memory 1120 may be physical devices used to store programs (e.g., sequences of instructions) or data (e.g., program state information) on a temporary or permanent basis for use by the computing device 1100. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1130 is capable of providing mass storage for the computing device 1100. In some implementations, the storage device 1130 is a computer-readable medium. In various different implementations, the storage device 1130 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1120, the storage device 1130, or memory on processor 1110.

The high speed controller 1140 manages bandwidth-intensive operations for the computing device 1100, while the low speed controller 1160 manages lower bandwidth-intensive operations. Such allocation of duties is exemplary only. In some implementations, the high-speed controller 1140 is coupled to the memory 1120, the display 1180 (e.g., through a graphics processor or accelerator), and to the high-speed expansion ports 1150, which may accept various expansion cards (not shown). In some implementations, the low-speed controller 1160 is coupled to the storage device 1130 and a low-speed expansion port 1190. The low-speed expansion port 1190, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1100*a* or multiple times in a group of such servers 1100*a*, as a laptop computer 1100*b*, or as part of a rack server system 1100*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Furthermore, the elements and acts of the various embodiments described above can be combined to provide further embodiments. Indeed, the methods and systems described herein may be embodied in a variety of other forms; furthermore, various omissions, substitutions and changes in the form of the methods and systems described herein may be made without departing from the spirit of the disclosure. Accordingly, other implementations are within the scope of the following claims.

What is claimed is:

1. A computer-implemented method comprising:
    obtaining, by data processing hardware of a robot, a topological map of an environment, wherein the topological map indicates a first route waypoint, a second route waypoint, a third route waypoint, a fourth route waypoint, a first route edge, and a second route edge collectively used by the robot to indicate a route, wherein the first route edge directly connects the first route waypoint and the second route waypoint, and wherein the second route edge directly connects the second route waypoint and the third route waypoint;
    determining, by the data processing hardware, using the topological map and first sensor data captured by the robot, a third route edge, wherein the third route edge directly connects the second route waypoint and the fourth route waypoint;
    determining, by the data processing hardware, using the first sensor data, that the third route edge is traversable by the robot;
    updating, by the data processing hardware, using the third route edge, the topological map to obtain an updated topological map based on determining that the third route edge is traversable by the robot; and
    instructing, by the data processing hardware, navigation of the robot according to the updated topological map.

2. The method of claim 1, further comprising:
    generating data indicating at least one of the first route waypoint, the second route waypoint, the third route waypoint, the fourth route waypoint, the first route edge, or the second route edge using odometry data captured by the robot.

3. The method of claim 1, wherein at least one of the first route waypoint, the second route waypoint, the third route waypoint, or the fourth route waypoint is associated with respective second sensor data captured by the robot.

4. The method of claim 1, wherein determining the third route edge comprises:
    determining, using the topological map, a local embedding;
    determining that a total path length between the second route waypoint and the fourth route waypoint satisfies a first threshold distance;
    determining that a distance in-associated with the local embedding satisfies a second threshold distance; and
    generating the third route edge based on determining that the total path length between the second route waypoint and the fourth route waypoint satisfies the first threshold distance and determining that the distance associated with the local embedding satisfies the second threshold distance.

5. The method of claim 1, wherein determining that the third route edge is traversable by the robot comprises:
    determining that the third route edge is traversable by the robot further using an output of a sensor data alignment algorithm.

6. The method of claim 5, wherein the sensor data alignment algorithm comprises at least one of an iterative closest point algorithm, a feature-matching algorithm, a normal distribution transform algorithm, a dense image alignment algorithm, or a primitive alignment algorithm.

7. The method of claim 1, wherein determining that the third route edge is traversable by the robot comprises:
    determining, using the topological map, a local embedding; and
    determining that the third route edge is traversable by the robot based on the local embedding and a path collision checking algorithm.

8. The method of claim 7, wherein the path collision checking algorithm comprises a circle sweep algorithm.

9. The method of claim 1, wherein determining the third route edge comprises:
    determining an embedding using a fiducial marker; and
    determining the third route edge based on the embedding.

10. The method of claim 1, wherein updating the topological map comprises:
    correlating a particular route waypoint with a metric location.

11. The method of claim 1, wherein updating the topological map comprises:
    determining an embedding using sparse nonlinear optimization.

12. The method of claim 1, wherein updating the updated topological map that is metrically consistent.

13. A system comprising:
data processing hardware; and
memory hardware in communication with the data processing hardware, the memory hardware storing instructions, wherein execution of the instructions by the data processing hardware causes the data processing hardware to:
  obtain a topological map of an environment, wherein the topological map indicates a first route waypoint, a second route waypoint, a third route waypoint, a fourth route waypoint, a first route edge, and a second route edge collectively used by a robot to indicate a route, wherein the first route edge directly connects the first route waypoint and the second route waypoint, and wherein the second route edge directly connects the second route waypoint and the third route waypoint;
  determine, using the topological map and first sensor data captured by the robot, a third route edge, wherein the third route edge directly connects the second route waypoint and the fourth route waypoint;
  determine, using the first sensor data, that the third route edge is traversable by the robot;
  update, using the third route edge, the topological map to obtain an updated topological map based on determining that the third route edge is traversable by the robot; and
  instruct navigation of the robot according to the updated topological map.

14. The system of claim 13, wherein the execution of the instructions by the data processing hardware further causes the data processing hardware to:
  generate data indicating at least one of the first route waypoint, the second route waypoint, the third route waypoint, the fourth route waypoint, the first route edge, or the second route edge using odometry data captured by the robot.

15. The system of claim 13, wherein at least one of the first route waypoint, the second route waypoint, the third route waypoint, or the fourth route waypoint is associated with a respective second sensor data captured by the robot.

16. The system of claim 13, wherein to determine the third route edge, the execution of the instructions by the data processing hardware further causes the data processing hardware to:
  determine, using the topological map, a local embedding;
  determine that a total path length between the second route waypoint and the fourth route waypoint satisfies a first threshold distance;
  determine that a distance associated with the local embedding satisfies a second threshold distance; and
  generate the third route edge based on determining that the total path length between the second route waypoint and the fourth route waypoint satisfies the first threshold distance and determining that the distance associated with the local embedding satisfies the second threshold distance.

17. The system of claim 13, wherein to determine that the third route edge is traversable by the robot, the execution of the instructions by the data processing hardware further causes the data processing hardware to:
  determine that the third route edge is traversable by the robot further using an output of a sensor data alignment algorithm.

18. The system of claim 17, wherein the sensor data alignment algorithm comprises at least one of an iterative closest point algorithm, a feature-matching algorithm, a normal distribution transform algorithm, a dense image alignment algorithm, or a primitive alignment algorithm.

19. The system of claim 13, wherein to determine that the third route edge is traversable by the robot, the execution of the instructions by the data processing hardware further causes the data processing hardware to:
  determine, using the topological map, a local embedding; and
  determine that the third route edge is traversable by the robot based on the local embedding and a path collision checking algorithm.

20. The system of claim 19, wherein the path collision checking algorithm comprises a circle sweep algorithm.

21. The system of claim 13, wherein to determine the third route edge, the execution of the instructions by the data processing hardware further causes the data processing hardware to:
  determine an embedding using a fiducial marker; and
  determine the third route edge based on the embedding.

22. The system of claim 13, wherein to update the topological map, the execution of the instructions by the data processing hardware further causes the data processing hardware to:
  correlate a particular route waypoint with a metric location.

23. The system of claim 13, wherein to update the topological map, the execution of the instructions by the data processing hardware further causes the data processing hardware to:
  determine an embedding using sparse nonlinear optimization.

24. The system of claim 13, wherein the updated topological map is metrically consistent.

* * * * *